(12) United States Patent
Guo et al.

(10) Patent No.: US 7,769,866 B2
(45) Date of Patent: Aug. 3, 2010

(54) VIRTUAL CONNECTIVITY WITH SUBSCRIBE-NOTIFY SERVICE

(75) Inventors: Chuanxiong Guo, Nanjing (CN); Jun Yuan, Beijing (CN); Qian Zhang, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 10/619,332

(22) Filed: Jul. 14, 2003

(65) Prior Publication Data

US 2005/0015427 A1    Jan. 20, 2005

(51) Int. Cl.
*G06F 15/16* (2006.01)
(52) U.S. Cl. .................. 709/227; 709/202; 709/228; 709/245; 719/318
(58) Field of Classification Search ......... 709/227–230, 709/238–242, 202–203, 245; 719/318
See application file for complete search history.

(56) References Cited

U.S. PATENT DOCUMENTS

| | | | | |
|---|---|---|---|---|
| 6,021,443 | A * | 2/2000 | Bracho et al. ............... | 709/241 |
| 6,484,200 | B1 * | 11/2002 | Angal et al. ................ | 709/224 |
| 6,865,613 | B1 * | 3/2005 | Millet et al. ................ | 709/245 |
| 7,050,432 | B1 * | 5/2006 | Banavar et al. ............ | 370/390 |
| 7,051,102 | B2 | 5/2006 | Gupta et al. | |
| 7,080,151 | B1 * | 7/2006 | Borella et al. ............... | 709/245 |
| 7,117,270 | B2 * | 10/2006 | Rosenblum ................ | 709/238 |
| 7,207,008 | B1 * | 4/2007 | Koch .......................... | 709/207 |
| 7,379,970 | B1 * | 5/2008 | Huang et al. ............... | 709/202 |
| 7,443,865 | B1 * | 10/2008 | Zhang et al. ................ | 709/227 |
| 7,516,174 | B1 * | 4/2009 | Tashjian et al. ............ | 709/245 |
| 7,581,010 | B2 * | 8/2009 | Guo et al. ................... | 709/227 |
| 7,647,427 | B1 * | 1/2010 | Devarapalli ................ | 709/245 |
| 2002/0188657 | A1 | 12/2002 | Traversat et al. | |
| 2003/0041141 | A1 | 2/2003 | Abdelaziz et al. | |
| 2004/0030743 | A1 | 2/2004 | Hugly et al. | |

(Continued)

FOREIGN PATENT DOCUMENTS

EP    1331791    7/2003

(Continued)

OTHER PUBLICATIONS

Fumio et al., "VIP: A protocol providing host mobility" Communications of the Assoction For Computing Machinery, ACM, New York, Aug. 1, 1994, vol. 37, No. 8, pp. 67-75.

(Continued)

*Primary Examiner*—Bharat N Barot
(74) *Attorney, Agent, or Firm*—Lee & Hayes, PLLC

(57) ABSTRACT

A middle layer network protocol enhancement, virtual connectivity (VC) makes the network attachment point changes of local and remote peers transparent to applications that use network services. A virtual connectivity module local to each peer translates communication connection parameters from apparent to real and vice versa, as well as sending and receiving secure connection updates directly to and from peers. Unlike Mobile IP, no routing infrastructure modifications are required. A subscribe-notify service provides connection update notifications when direct peer-to-peer connection updates are not possible, for example, when two communicating peers move simultaneously or when the moving peer is communicating with a peer behind network address translation (NAT). Methods for detecting these conditions are disclosed, as is a virtual connectivity protocol and virtual connectivity module architecture.

21 Claims, 20 Drawing Sheets

U.S. PATENT DOCUMENTS

2004/0064512 A1     4/2004     Arora et al.
2004/0111469 A1     6/2004     Manion et al.

FOREIGN PATENT DOCUMENTS

JP     2003087843(A)     3/2003

OTHER PUBLICATIONS

Perkins et al., "Mobility support inIPV6" Mobicom, Nov. 10, 1996, pp. 1-11.
Schulzrinne et al., "Application-Layer Mobility Using SIP", IEEE San Francisco, CA, Dec. 2000, pp. 29-36.
Snoeren et al., "An End-to-End Approach to Host Mobility", MIT Laboratory for Computer Science, Aug. 2000, pp. 155-166.
Su et al., "Mobile Communication with Virtual Network Address Translation", Technical Report, Department of Computer Science, Columbia University, Feb. 2002, pp. 1-14.
Zhang et al., "A "Persistent Connection" Model for Mobile and Distributed Systems," Computer Communications and Networks, IEEE, Sep. 1995, pp. 300-307.
Egevan, K. et al., "The IP Network Address Translator (NAT)", *Network Working Group*, Request for Comments No. 1631, 10 pgs (May 1994).
Information Sciences Institute, "Internet Protocol: DARPA Internet Program Protocol Spectification", *Defense Advanced Research Projects Agency Information Processing Techniques Office*, Request for Comments No. 791, 45 pgs (Sep. 1981).
Information Sciences Institute, "Transmission Control Protocol: DARPA Internet Protocol Specification", *Defense Advanced Research Projects Agency Information Processing Techniques Office*, Request for Comments No. 793, 85 pgs (Sep. 1981).
Johnson et al., "Mobility Support in IPv6", *IETF Mobile IP Working Group*, Internet Draft, 149 pgs (Oct. 29, 2002).
Larzon et al., "The UDP Lite Protocol", *Transport Area Working Group*, Internet Draft, 8 pgs (Jan. 24, 2002).
Levkowetz, et al., "Mobile IP NAT/NAPT Traversal Using UDP Tunnelling", *Internet Engineering Task Force*, Internet Draft, 35 pgs (Nov. 4, 2002).
Perkins, Ed, "IP Mobility Support for IPv4", *Network Working Group*, Request for Comments No. 3344, 99pgs (Aug. 2002).
Postel, J., "User Datagram Protocol", *Information Sciences Institute*, Request for Comments No. 768, 3 pgs (Aug. 28, 1980).
Snoeren, Alex C. and Hari Balakrishnan, "An End-to-End Approach to Host Mobility", $6^{th}$ *ACM/IEEE International Conference on Mobile Computing and Networking (MobiCom '00)*, 12 pgs (Aug. 2000).
Zimmermann, Hubert, "OSI Reference Model—The ISO Model of Architecture for Open Systems Interconnection", *IEEE Transactions on Communications*, vol. COM-28, No. 4, pp. 425-432,(Apr. 1980).

* cited by examiner

| IP Header | UDP Header | UDP Body | VC Options |
|---|---|---|---|
| 2008 | 2004 | 2006 | 2002 |

FIG. 20

VIRTUAL CONNECTIVITY WITH SUBSCRIBE-NOTIFY SERVICE

FIELD OF THE INVENTION

This invention pertains generally to computer networks, and, more particularly, to computer networks in which a networked computer is capable of changing its network attachment point.

BACKGROUND OF THE INVENTION

Today's large computer networks typically provide a network user, particularly a mobile network user, with the opportunity to attach to the network at multiple points. The network user may be motivated to change network attachment points because different network attachment points may, for example, offer different qualities of service, at different costs, and/or be maintained by different organizations. A computer may even be configured to automatically change network attachment points, for example, in order to minimize cost and/or maximize quality of service.

It is typically desirable for applications that utilize computer network services, that the computer network service be as transparent as possible to the application, that is, that the application need be aware of as few computer network service implementation details as possible, particularly with regard to lower layer network protocol changes. For computer networks that don't incorporate suitable facilities in to their base protocol, making network attachment point change transparent to an application may require additional mechanisms. For example, when a computer changes its attachment point to the Internet, the new network attachment point is typically associated with a new Internet Protocol (IP) address. Under baseline Internet Protocol version 4 (IPv4) or Internet Protocol version 6 (IPv6), for example, an application on the computer that has active connections before a network attachment point change may need to make provision to rebuild those connections following the change.

For the purposes of this description, conventional attempts to make network attachment point change transparent to the application may be classified as infrastructure solutions and end-to-end solutions. Infrastructure solutions typically require additional network elements and/or network routing system modifications. For example, Mobile IP for IPv4 and Mobile IP for IPv6 are routing-based infrastructure solutions that require an additional Home Agent network element. In contrast, end-to-end solutions manage network attachment point change at communication endpoints, independent of network routing. An example end-to-end solution is described by Snoeren et al., *An End-to-End Approach to Host Mobility*, 6th ACM/IEEE International Conference on Mobile Computing and Networking, August 2000 ("Snoeren et al"). An advantage of end-to-end solutions is that they may enable transparent network attachment point change without modification to existing network infrastructure.

Conventional solutions have drawbacks. For example, Mobile IP for IPv4 and Mobile IP for IPv6 include routing indirection which may introduce routing inefficiencies and violate network security models. Some conventional end-to-end solutions fail to handle the case where each computer that is party to a communication connection changes its network attachment point simultaneously, or else handle the case inconsistently. The use of Network Address Translation (NAT) in a computer network is another aspect of modern computer networks that is handled inefficiently and/or inconsistently by some conventional solutions.

Some conventional solutions handle different versions of a network protocol differently, which may harm transparency. Some computer networks provide support layered protocols, for example, the Internet Protocol is commonly used in conjunction with a Transmission Control Protocol (TCP) and a User Datagram Protocol (UDP). Some conventional solutions support aspects of upper protocol layers only inefficiently or inconsistently, for example, a solution may support TCP over IP but fail to work properly with UDP over IP. Transparency may be improved if the application need not be aware that different aspects of a layered protocol are handled differently.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, network attachment point change event subscriptions are received from network attachment point change event subscribers. Network attachment point change event publications are received from network attachment point change event publishers. When a network attachment point change event matches a network attachment point change event subscription, the subscriber that sent the network attachment point change event subscription is notified.

In an embodiment of the invention, a computer may send a subscribe message to a virtual connectivity subscribe-notify service subscribing to network attachment point change events published by a remote peer.

In an embodiment of the invention, a computerized system includes a virtual connectivity subscribe-notify service match module configured to search a network attachment point change event subscription database for network attachment point change event subscriptions that match network attachment point change events.

BRIEF DESCRIPTION OF THE DRAWINGS

While the appended claims set forth the features of the invention with particularity, the invention and its advantages are best understood from the following detailed description taken in conjunction with the accompanying drawings, of which:

FIG. 20 is a schematic diagram of a UDP/IP datagram incorporating virtual connectivity options in accordance with an embodiment of the invention.

DETAILED DESCRIPTION OF THE INVENTION

Prior to proceeding with a description of the various embodiments of the invention, a description of a computer and networking environment in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
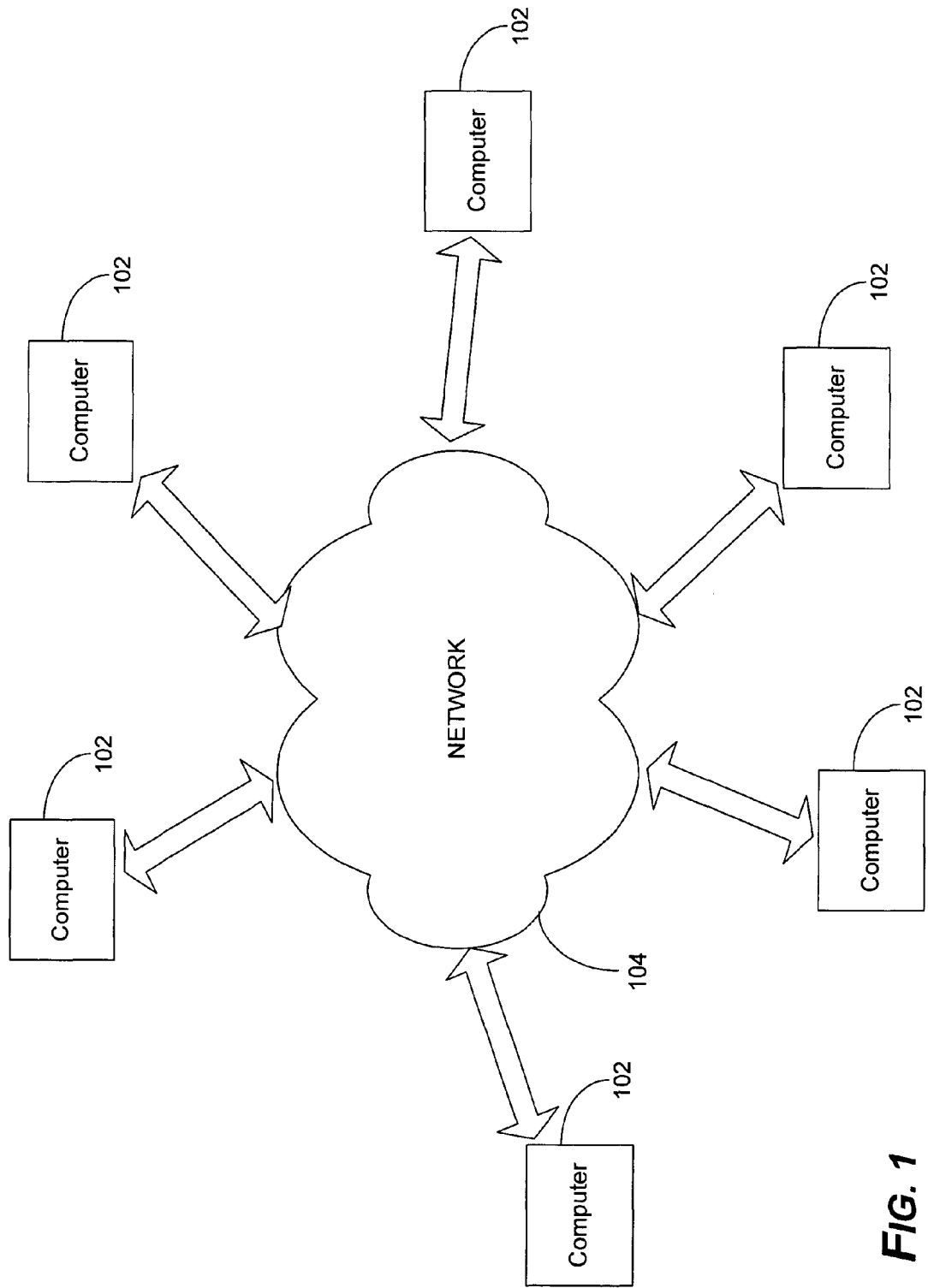
FIG. 1 is a schematic diagram illustrating computers connected by a network.

An example of a computer networking environment suitable for incorporating aspects of the invention is described with reference to FIG. 1. The example computer networking environment includes several computers 102 communicating with one another over a network 104, represented by a cloud. Network 104 may include many well-known components, such as routers, gateways, hubs, etc. and allows the computers 102 to communicate via wired and/or wireless media. When interacting with one another over the network 104, one or more of the computers 102 may act as clients, servers or peers with respect to other computers 102. Accordingly, the various embodiments of the invention may be practiced on clients, servers, peers or combinations thereof, even though specific examples contained herein may not refer to all of these types of computers.

Figure 2:
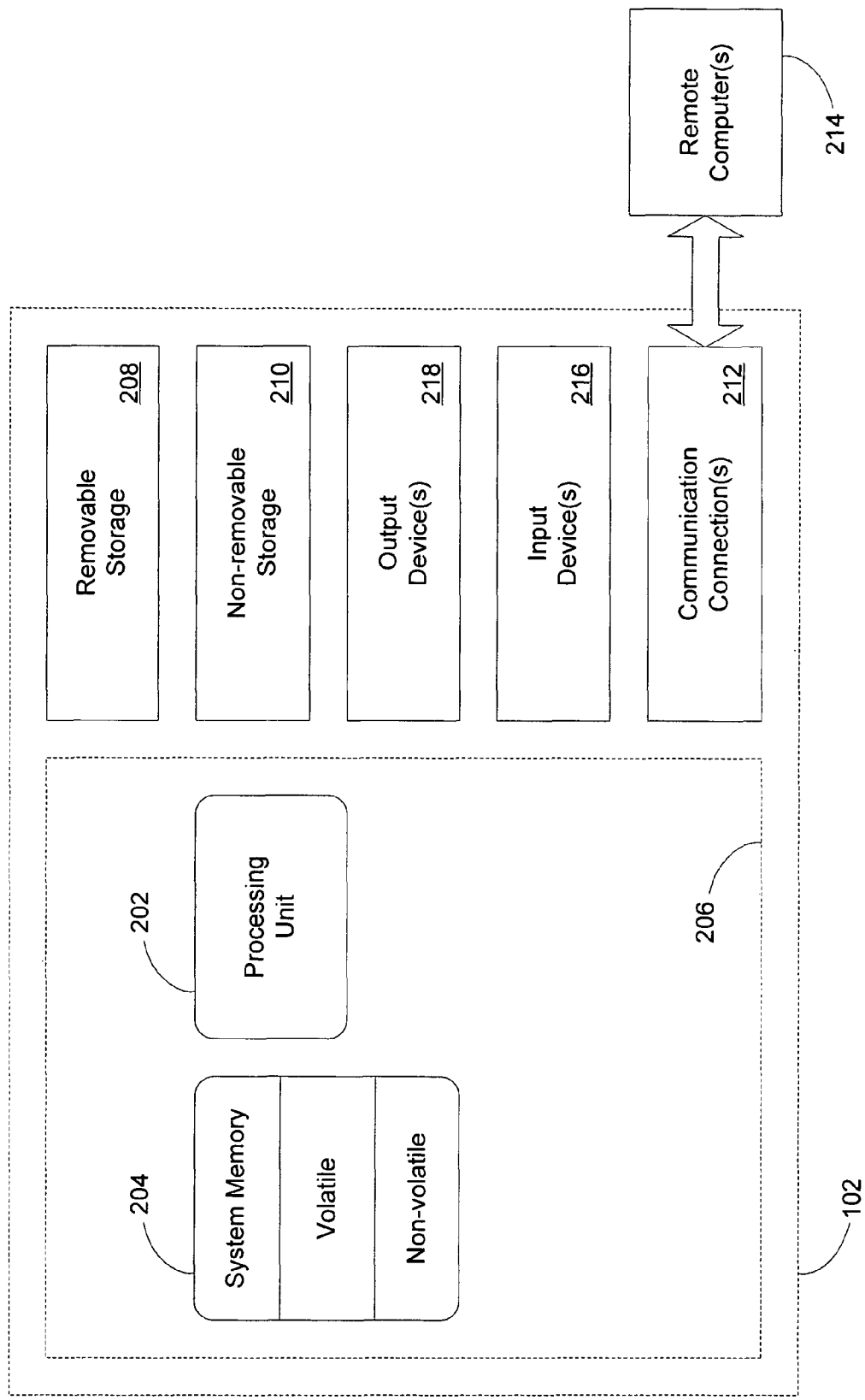
FIG. 2 is a schematic diagram generally illustrating an exemplary computer system usable to implement an embodiment of the invention.

Referring to FIG. 2, an example of a basic configuration for the computer 102 on which aspects of the invention described herein may be implemented is shown. In its most basic configuration, the computer 102 typically includes at least one processing unit 202 and memory 204. The processing unit 202 executes instructions to carry out tasks in accordance with various embodiments of the invention. In carrying out such tasks, the processing unit 202 may transmit electronic signals to other parts of the computer 102 and to devices outside of the computer 102 to cause some result. Depending on the exact configuration and type of the computer 102, the memory 204 may be volatile (such as RAM), non-volatile (such as ROM or flash memory) or some combination of the two. This most basic configuration is illustrated in FIG. 2 by dashed line 206.

The computer 102 may also have additional features/functionality. For example, computer 102 may also include additional storage (removable 208 and/or non-removable 210) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 212 that allow the device to communicate with other devices such as remote computer(s) 214. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 216 such as a keyboard/keypad, mouse, pen, voice input device, touch input device, etc. Output devices 218 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an embodiment of the invention, a protocol for establishing and maintaining communication connections in a computer network may be implemented by multiple protocol layers, for example, corresponding to layers described by an Open Systems Interconnect (OSI) model of the International Standards Organization (ISO). For details of an OSI model see Zimmerman, *OSI Reference Model—The ISO Model of Architecture for Open System Interconnection*, IEEE Transactions on Communications, April 1980. In an embodiment of the invention, a virtual connectivity (VC) layer is added to the protocol or is incorporated into an existing protocol layer. In what follows, examples are described with reference to the Internet Protocol (IP) and IP-based protocols, however, embodiments of the invention are not so limited, and the examples may be generalized to any networking protocol with stateless routing.

Figure 3:
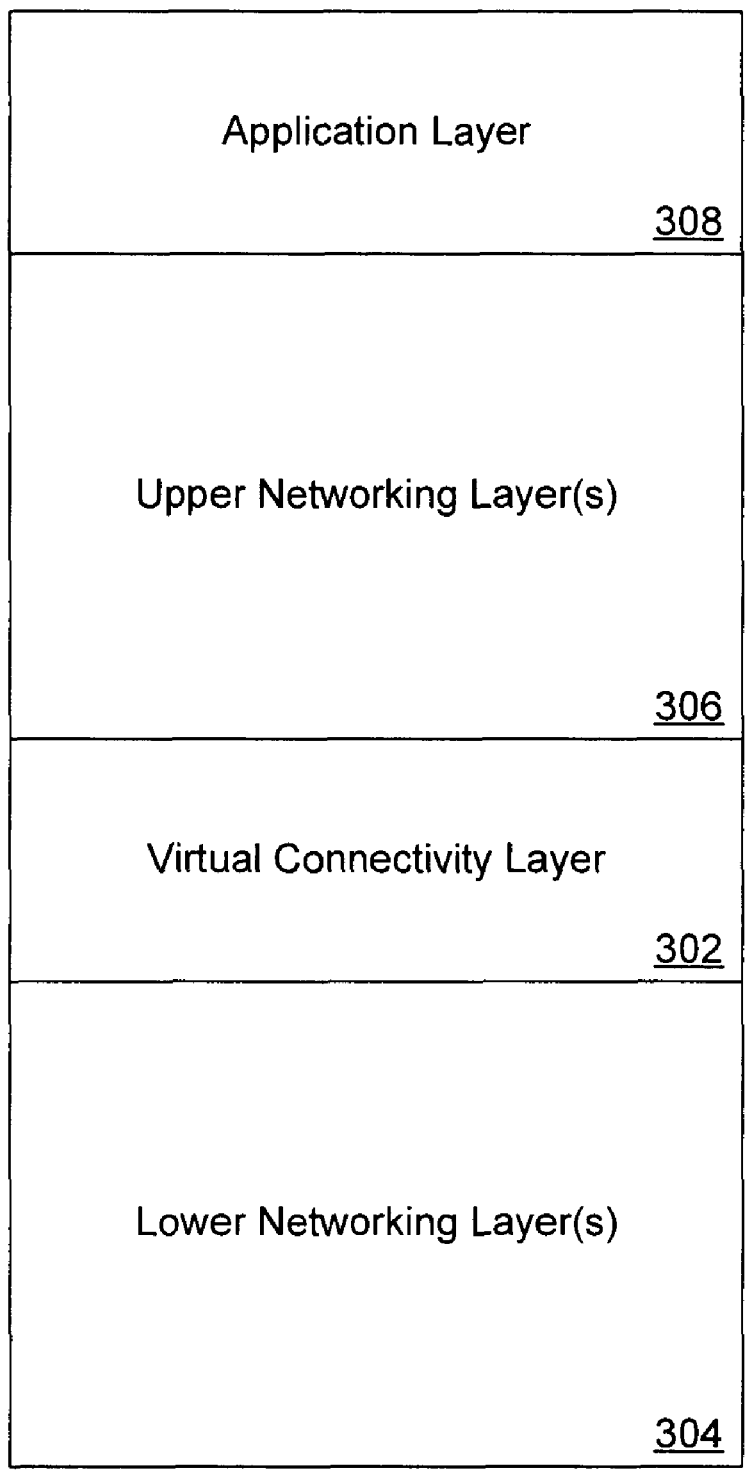
FIG. 3 is a schematic diagram of a layered networking model incorporating a virtual connectivity layer in accordance with an embodiment of the invention.

FIG. 3 illustrates an example scheme for adding the virtual connectivity layer to existing networking layers. The virtual connectivity layer 302 resides between one or more lower networking layers 304 and one or more upper networking layers 306. Examples of lower networking layers 304 include a physical layer that determines the formatting of signals in a physical medium, and a medium access control (MAC) layer that controls access by multiple computers (e.g., computers 102 of FIG. 1) to a shared physical communications medium. Examples of upper networking layers 306 include a session layer that enforces user-based authentication dependent policies, and a presentation layer that translates data from a common network transmission format to a particular application format.

An application layer 308 utilizes network services by interacting with the upper network layers 306. The upper network layers 306 interact with the virtual connectivity layer 302, and the virtual connectivity layer 302 interacts with the lower networking layers 304. At least one of the lower networking layers 304 interacts with the physical transmission medium. In an embodiment of the invention, the virtual connectivity layer 302 virtualizes communication connections (e.g., the communication connections 212 of FIG. 2) by enabling the application layer 308 to refer to a connection by the connection's original identification information even if a party to the connection changes its network attachment point.

Figure 4:
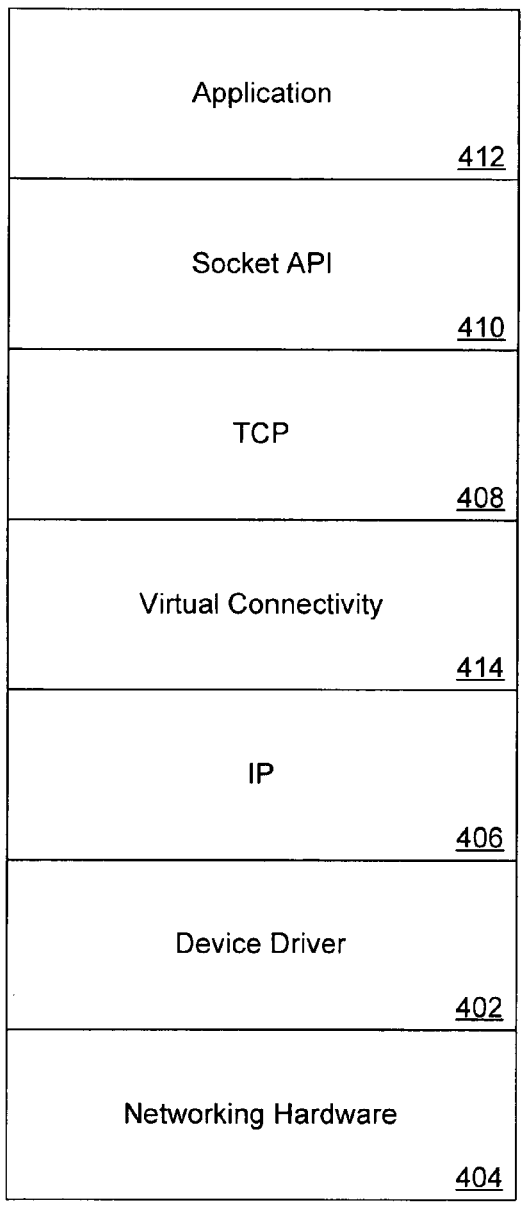
FIG. 4 is a schematic diagram of an example layered TCP/IP implementation incorporating a virtual connectivity layer in accordance with an embodiment of the invention.
Figure 5:
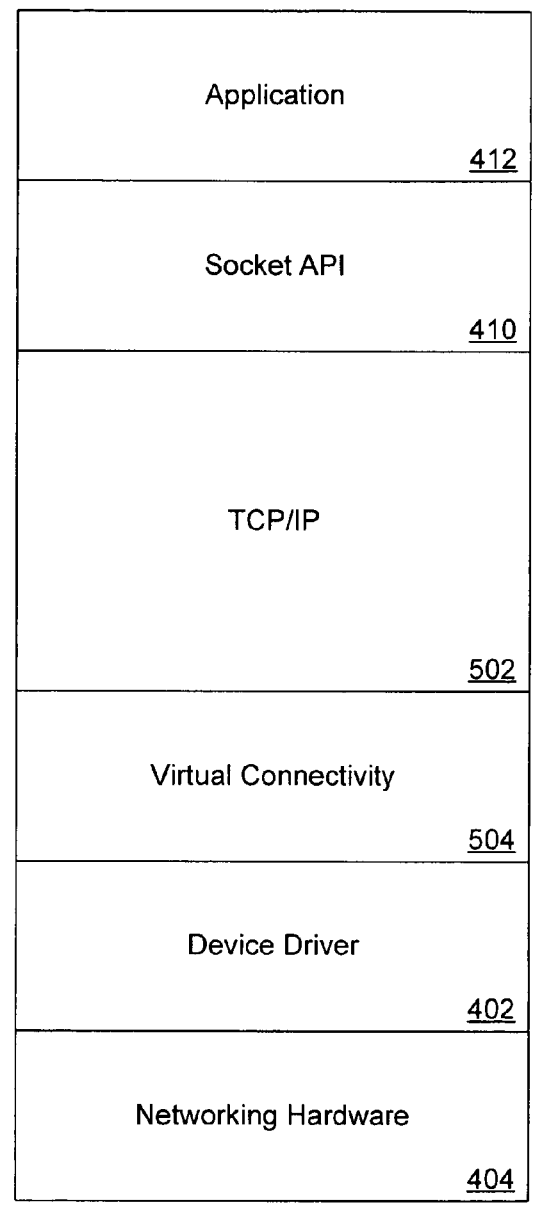
FIG. 5 is a schematic diagram of another example layered TCP/IP implementation incorporating a virtual connectivity layer in accordance with an embodiment of the invention.

FIG. 4 and FIG. 5 illustrate two examples of incorporating an additional virtual connectivity layer into a layered TCP/IP implementation in accordance with an embodiment of the invention. In FIG. 4, the lower networking layers include a device driver 402 that provides an interface to networking hardware 404 and an IP layer 406 that implements Internet Protocol functionality independent of upper networking layers. The upper networking layers include a TCP layer 408 that implements transmission control aspects of TCP/IP and a network socket application programming interface (API) 410 utilized by an application 412 to access computer network services. In FIG. 4, the virtual connectivity layer 414 is located between the TCP layer 408 and the IP layer 406 allowing for intercept of outgoing data (i.e., data to be sent) before the data is seen by the IP layer 406, as well as for intercept of incoming data (i.e., received data) after the IP layer 406 has finished processing the data with respect to Internet Protocol functionality.

In some conventional TCP/IP implementations, the IP layer and TCP layer are implemented as a single data processing module, for example, to increase performance. When this is the case, it may be advantageous to add a virtual connectivity layer 502 at an alternate location shown in FIG. 5, for example, so as to minimize modification of the existing implementation. Minimizing modifications to the existing implementation may reduce the number of errors introduced by a new module, thus resulting in a more stable system post-modification. In FIG. 5, the virtual connectivity layer 502 is located between a fused TCP/IP layer 504 and the device driver 402 (i.e., the same device driver as device driver 402 of FIG. 4). Outgoing data is intercepted by the virtual connectivity layer 502 after being processed by the TCP/IP layer 504. Incoming data is intercepted by the virtual connectivity layer 502 before being passed to the TCP/IP layer 504.

Figure 6:
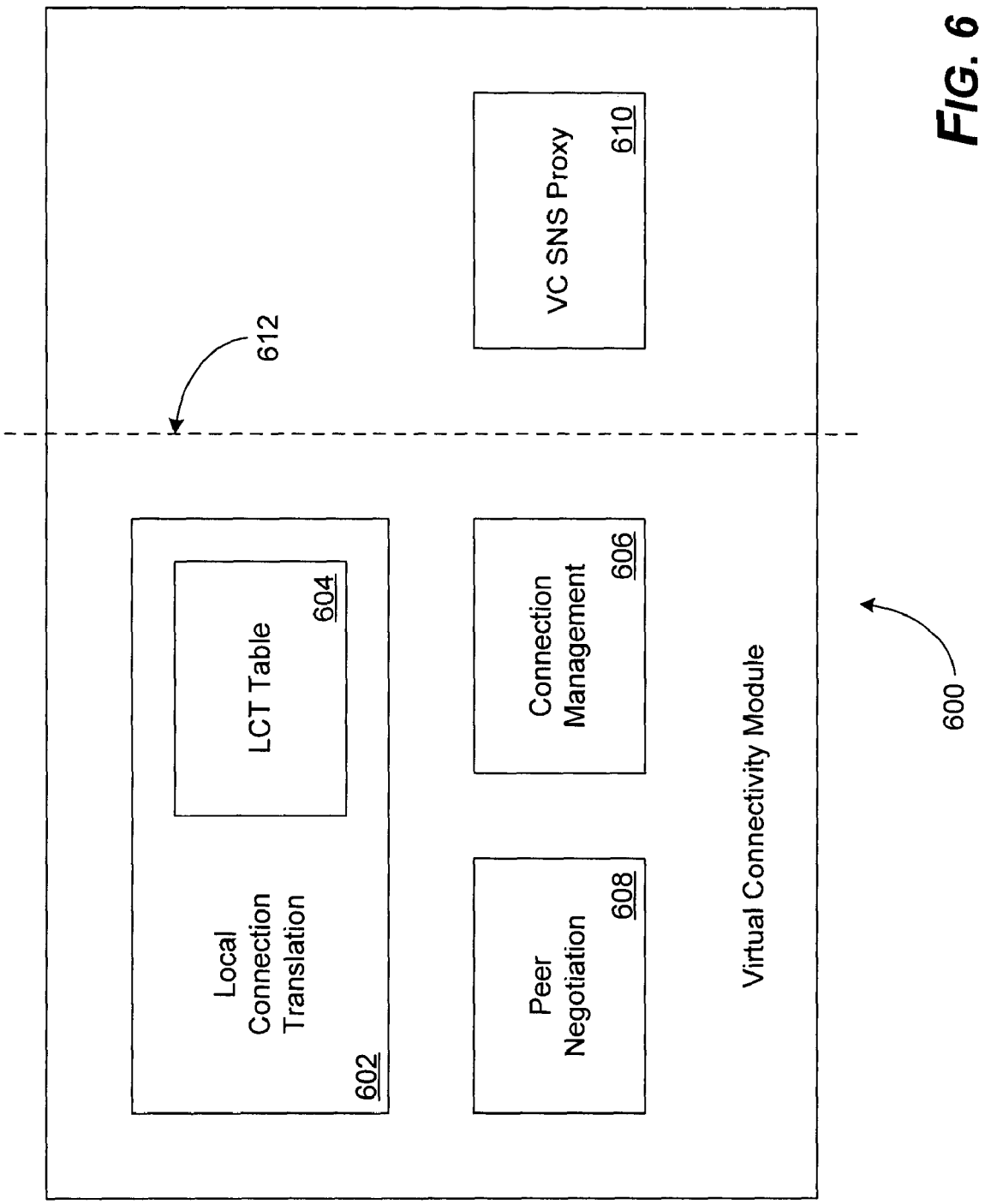
FIG. 6 is a schematic diagram depicting an example virtual connectivity module suitable for implementing virtual connectivity layer services in accordance with an embodiment of the invention.

FIG. 6 depicts an example virtual connectivity module suitable for implementing virtual connectivity layer services in accordance with an embodiment of the invention. A virtual connectivity module 600 includes a local connection translation (LCT) component 602 configured to translate communication connections based on information in a local connection translation table 604. A connection management component 606 is configured to synchronize entries in the local connection translation table 604 with corresponding entries at remote peers (i.e., remote computers 214 of FIG. 2). A peer negotiation component 608 exchanges virtual connectivity preferences with peers as well as negotiating a basis for authentication of peer-sent virtual connectivity protocol messages.

The virtual connectivity module 600 may include a virtual connectivity subscribe-notify service (VC SNS) proxy component 610 which serves as a local proxy to a remote virtual connectivity subscribe-notify service (not shown in FIG. 6, but described below with reference to FIG. 10). The particular remote virtual connectivity subscribe-notify service utilized by the local component 610 may, for example, be configured via dynamic host configuration protocol (DHCP). In the example depicted by FIG. 6, the VC SNS proxy 610 is executed in user-mode whereas the remaining components of the virtual connectivity module 600 are executed in kernel-mode. The dashed line 612 delineates the boundary between kernel-mode and user-mode in an executing virtual connectivity module 600. The use of kernel-mode and user-mode in the context of a computer operating system is known in the art and need not be detailed here.

The local connection translation table 604 includes an entry for each active communication connection between peers. In an embodiment of the invention, the entry is added when the communication connection is established and deleted when the communication connection ends. Each entry in the local connection translation table 604 associates an original connection specification with a current connection specification. A connection specification includes one or more communication connection parameters and may uniquely identify a communication connection for a particular network protocol layer or set of network protocol layers. In an embodiment of the invention, there is a one-to-one relationship between each original connection specification and current connection specification.

The connection specification may include a network attachment point identifier (a network address) for each peer participating in the connection, for example, an IP address in an IP network, an IP address and TCP port in a TCP/IP network, or an IP address and UDP port in an UDP/IP network. In an embodiment of the invention, if none of the peers participating in an active communication connection has changed its network attachment point, the current connection specification for the corresponding entry is the same as the original connection specification. However, if one or more of the peers does move (i.e., does change its network attachment point) then the current connection specification is updated. In an embodiment of the invention, the original connection specification remains unchanged throughout the life of the communication connection.

The following table is an example of a connection specification for an IP-based computer network supporting upper layer protocols such as TCP and UDP.

| Name | Type |
| --- | --- |
| Local IP Address | IPv4 or IPv6 address |
| Local Port | 16 bit port number |
| Remote IP Address | IPv4 or IPv6 address |
| Remote Port | 16 bit port number |
| Upper Layer Protocol Type | Protocol type enumeration |

The table includes a local IP address identifying the IP network attachment point of the local peer and a local port number identifying an upper layer protocol port at the local peer. The local peer may participate in multiple communication connections. Each communication connection may be associated with a port number. Similarly, the table further includes a remote IP address and remote port number. The upper layer protocol type indicates a type of upper layer protocol being routed by the IP network, for example, TCP or UDP. In an embodiment of the invention, the combination of local and remote IP addresses, upper layer protocol type, and local and remote port numbers specifies a communication connection.

The virtual connectivity module 602 may intercept each outgoing network protocol unit (e.g., IP datagram) in an outbound data stream and each incoming network protocol unit in an inbound data stream. In an embodiment of the invention, for each outgoing network protocol unit intercepted by the virtual connectivity module 602, the local connection translation component 602 translates the connection specification associated with the outgoing network protocol unit from the original connection specification to the current connection specification. Furthermore, for each incoming network protocol unit intercepted by the virtual connectivity module 602, the local connection translation component 602 translates the connection specification associated with the incoming network protocol unit from the current connection specification to the original connection specification. An example translation operation is illustrated in FIG. 7 for an IP-based network.

Figure 7:
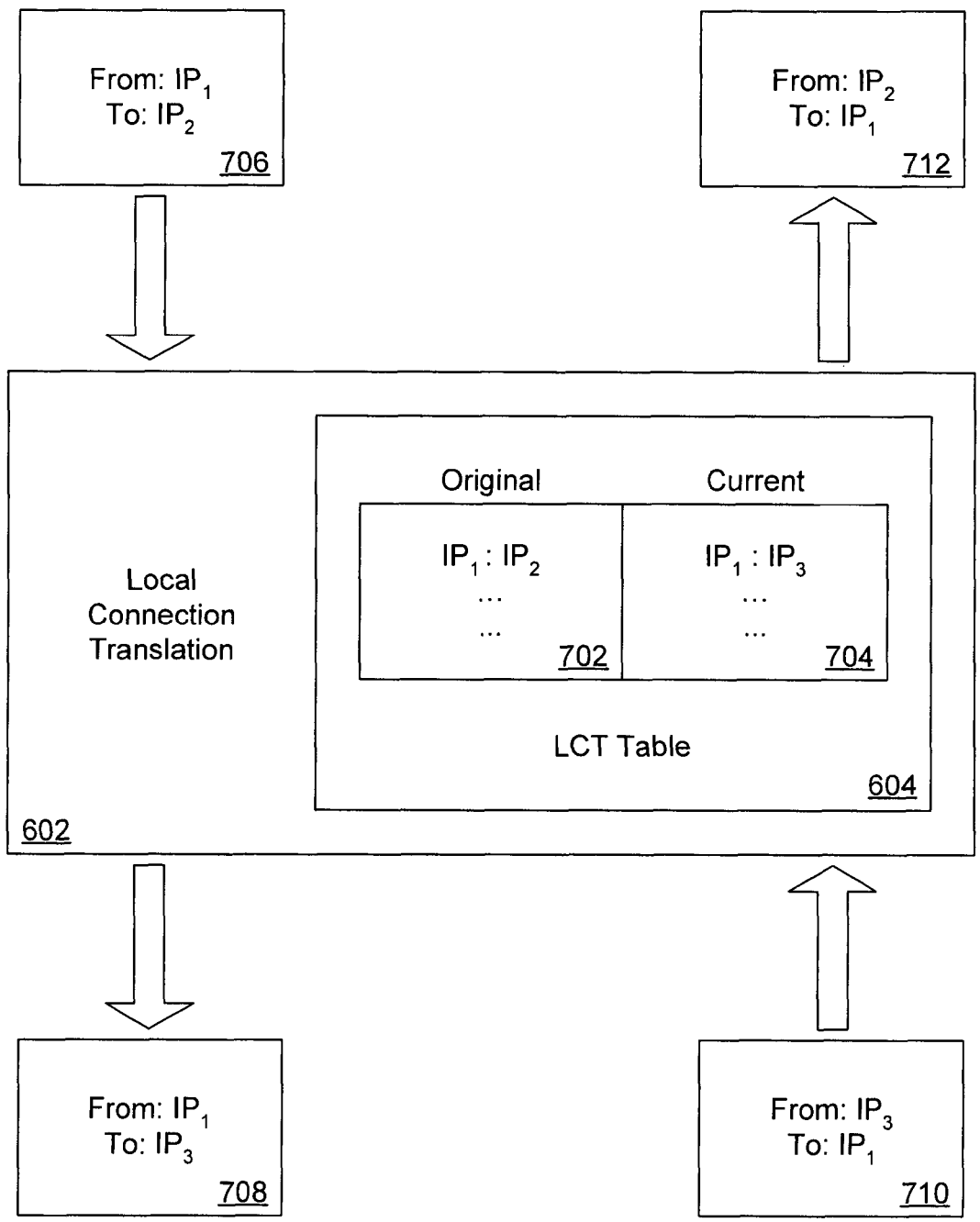
FIG. 7 is a schematic diagram illustrating an example local connection translation operation in accordance with an embodiment of the invention.

In FIG. 7, the local connection translation table 604 includes original connection specifications 702 associated with current connection specifications 704. One of the original connection specifications $IP_1:IP_2$ includes a local IP address $IP_1$ and a remote IP address $IP_2$, that is, at the time the active connection was originally established, the local computer was attached to the IP network at address $IP_1$ and the remote computer was attached to the IP network at address $IP_2$. At some point during the life of the connection, the remote computer changed its IP network attachment point to address $IP_3$, as a result the current connection specification $IP_1:IP_3$ is different from the original connection specification $IP_1:IP_2$. The current connection specification $IP_1:IP_3$ has the same local IP address $IP_1$ but the remote IP address $IP_3$ has changed from the original remote IP address $IP_2$. The remote port number may likewise change although this detail is not shown in FIG. 7.

An outgoing protocol unit 706 is intercepted by the virtual connectivity module 600 (FIG. 6) and submitted to the local connection translation component 602 for translation. Each protocol unit 706, 708, 710, 712 may be an IP datagram, a TCP datagram, a UDP datagram, or the like. Each protocol unit 706, 708, 710, 712 is associated with a source (from) IP address and a destination (to) IP address. The IP addresses may be incorporated into the protocol unit, for example, in the case of an IP datagram, or may be part of the context of the protocol unit, for example, contextual data parsed from lower protocol layers, parsed from previous protocol units in the data stream, explicitly specified by upper protocol layers, or part of the operating system environment.

The local connection translation component 602 determines the connection specification for the outgoing protocol unit 706. For the outgoing protocol unit 706 this corresponds to the original connection specification $IP_1:IP_2$. The local connection translation component 602 then performs a lookup of the local connection translation table 604 (utilizing well-known techniques) to find the corresponding current connection specification which, in this case, is current connection specification $IP_1:IP_3$. The local connection translation component 602 replaces the IP address and any other connection specification associations of protocol unit 706 (in the protocol unit or in the protocol unit's context, as appropriate) with data from the current connection specification $IP_1:IP_3$ resulting in translated outgoing protocol unit 708.

Similarly, incoming protocol unit 710 is intercepted by the virtual connectivity module and submitted to the local connection translation module 602 for translation. The local connection translation module determines that incoming protocol unit 710 is associated with current connection specification $IP_1:IP_3$, performs a lookup of the local connection translation table 604 to find the corresponding original connection specification $IP_1:IP_2$, and then replaces the connection specification associations of protocol unit 710 to give translated incoming protocol unit 712, which is then passed on to the higher protocol layers. In an embodiment of the invention, the upper protocol layers and in particular the application, see connection specification information corresponding to the original connection specification while the lower protocol layers see connection specification information corresponding to the current connection specification.

Returning to FIG. 6, in an embodiment of the invention, the current connection specification may be updated because the local peer (i.e., the peer where the local connection translation table 604 resides) moves or because a remote peer moves. In an embodiment of the invention, each peer participating in a connection has its own virtual connectivity module 600 and thus its own local connection translation (LCT) table 604. If one of the peers participating in the connection moves, in an embodiment of the invention, the corresponding current connection specification is updated at each participating peer. The virtual connectivity module 600 may be capable of detecting a local change in network attachment point, or may be informed of the local change by another local module, e.g., the local module that initiated the change. The locally detected change may first result in an update of the local LCT table 604. The following table shows an example update of parts of a local LCT table for an IP-based network.

|  | Original Connection Specification | Current Connection Specification |
|---|---|---|
| Before | $IP_2, port_2, IP_1, port_1, TCP$ | $IP_2, port_2, IP_1, port_1, TCP$ |
| After | $IP_2, port_2, IP_1, port_1, TCP$ | $IP_3, port_3, IP_1, port_1, TCP$ |

In the example update shown in the table, an active TCP/IP connection exists between a local peer with IP address $IP_2$ and a remote peer with IP address $IP_1$. In this example, the connection specification is a 5-tuple including the IP address and port number of the local peer (originally $IP_2$ and $port_2$), the IP address and port number of the remote peer (i.e., $IP_1$ and $port_1$), and the upper layer protocol type (i.e., TCP). The local peer changes its IP network attachment point so that its IP address and port number becomes $IP_3$ and $port_3$. Before the change, the original connection specification and current connection specification are the same, that is, the 5-tuple ($IP_2$, $port_2$, $IP_1$, $port_1$, TCP). After the change, the original connection specification is the same, but the current connection specification is updated with the new IP network attachment point, that is, it is now the 5-tuple ($IP_3$, $port_3$, $IP_1$, $port_1$, TCP).

In an embodiment of the invention, in order to update active connection table(s) 604 at remote peer(s), the local connection management component 606 is informed of the local network attachment point change. The local connection management component 606 may communicate with remote connection management component(s) with at least three virtual connectivity messages: Connection Update (CU), Connection Update Acknowledge (CUA), and Connection Update Request (CUR).

The Connection Update message may carry changed connection specification information from the peer where the change occurred to a remote peer participating in the communication connection. In an embodiment of the invention, when a peer changes its network attachment point, the peer sends the Connection Update message to each peer with which it has an active communication connection. The Connection Update Acknowledge message may be sent in reply to the Connection Update message to acknowledge the receipt of the Connection Update message. The Connection Update Acknowledge message may include the same information as a Connection Update message. The Connection Update Request message may be sent by a peer to request a Connection Update message from the recipient, for example, when the peer has been notified that the recipient has changed its network attachment point, but the recipient has not sent the peer a Connection Update message.

Figure 8:
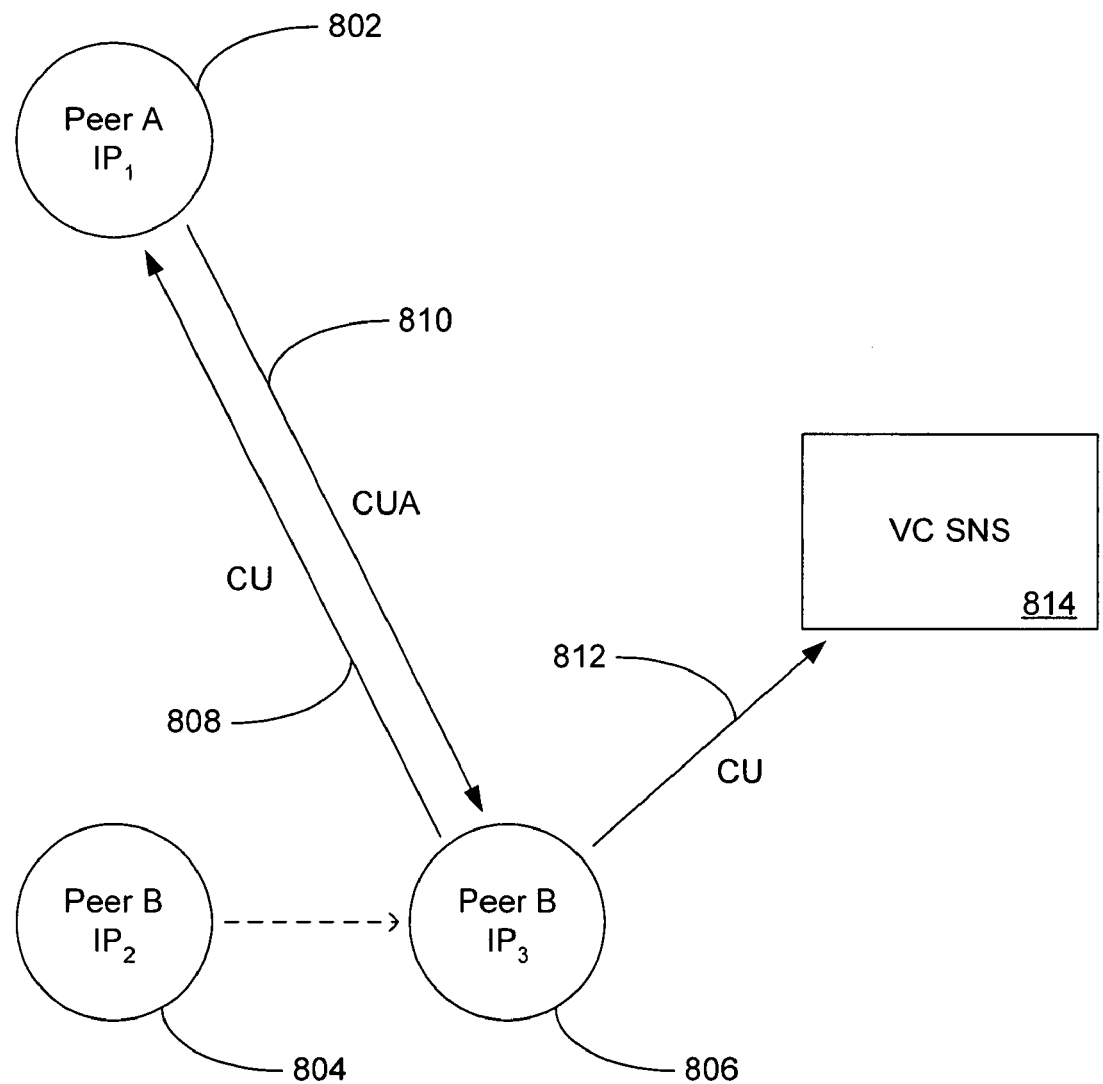
FIG. 8 is a schematic diagram illustrating an example virtual connectivity protocol in accordance with an embodiment of the invention.

FIG. 8 depicts an example of communicating peers with virtual connectivity modules exchanging virtual connectivity messages to maintain an IP-based communication connection when one of the peers changes its IP network attachment point. In FIG. 8, Peer A 802 has an active communication connection with Peer B 804 over an IP network. Peer A 802 is attached to the IP network at IP address $IP_1$ and Peer B 804 is originally attached to the IP network at IP address $IP_2$. During the life of the connection, Peer B 804 changes its IP network attachment point to IP address $IP_3$. The change is shown schematically in FIG. 8 as Peer B 804 moving (indicated by the dashed arrow) to Peer B 806.

Following the move, Peer B 806 updates its local LCT table as described above and then sends a Connection Update message 808 to Peer A 802. Following the move and until Peer A 802 receives the Connection Update message 808, Peer A 802 may be unable to communicate with Peer B 806 because Peer A 802 is unaware of Peer B's 806 new IP network attachment point. The Connection Update message 808 includes information identifying Peer B's 806 new network attachment point, for example, the new IP address $IP_3$ and a new port number $port_3$. In addition, the Connection Update message 808 includes information referencing the original connection, for example, an original connection identifier such as the original IP address $IP_2$ and port number $port_2$, the original connection specification, or a connection token corresponding to the original connection. A suitable connection token may, for example, be a cryptographic hash of the original connection specification, or a connection count as maintained by one of the communicating peers.

Upon receipt of the Connection Update message 808 by the virtual connectivity module of Peer A 802, the Connection Update message 808 is parsed by the connection management component (e.g., the connection management component 606 of FIG. 6) and the corresponding original connection specification determined. For example, the Connection Update message 808 may contain the original connection specification, or contain sufficient information such that the original connection specification may be reconstructed in combination with local (to Peer A 802) context, or, if the Connection Update message 808 contains the original connection token, the original connection specification may be determined by performing a lookup of a table (or similar data structure) associating connection tokens with connection specifications. With the original connection specification in hand, the corresponding current connection specification in the local connection translation table (e.g., the local connection translation table 604 of FIG. 6) may be updated. The following table illustrates aspects of the update at Peer A 802.

|  | Original Connection Specification | Current Connection Specification |
|---|---|---|
| Before | $IP_1, port_1, IP_2, port_2, TCP$ | $IP_1, port_1, IP_2, port_2, TCP$ |
| After | $IP_1, port_1, IP_2, port_2, TCP$ | $IP_1, port_1, IP_3, port_3, TCP$ |

Before Peer B's 804 move, both the original connection specification and the current connection specification are the same 5-tuple, that is, the IP address and port number for Peer A 802 (i.e., $IP_1$ and $port_1$), the IP address and port number for Peer B 804 (i.e., $IP_2$ and $port_2$), and the upper layer protocol type, in this case, TCP. After Peer B's 804 move, the current connection specification is updated with respect to Peer B's new network attachment point (i.e., $IP_2$ and $port_2$ become $IP_3$ and $port_3$) so that the current connection specification 5-tuple becomes ($IP_1$, $port_1$, $IP_3$, $port_3$, TCP). The original connection specification is unaffected by the move.

In reply to the Connection Update message 808, Peer A 802 sends a Connection Update Acknowledge message 810 to Peer B 806. The Connection Update Acknowledge message 810 may inform Peer B 806 of the success or otherwise of the connection update operation at Peer A 802. Following the receipt of the Connection Update Acknowledge message 810, Peer A 802 and Peer B 806 may once again engage in IP-based communications. In addition, in an embodiment of the invention, protocol and application layers above the virtual connectivity layer are unaware of Peer B's 806 IP network attachment point change.

As well as the Connection Update message 808 that Peer B 806 sends to Peer A 802, in FIG. 8, Peer B 806 also sends a Connection Update message 812 to a virtual connectivity subscribe-notify service (VC SNS) 814. A virtual connectivity subscribe-notify service in accordance with an embodiment of the invention is described below with reference to FIG. 10.

Figure 9:
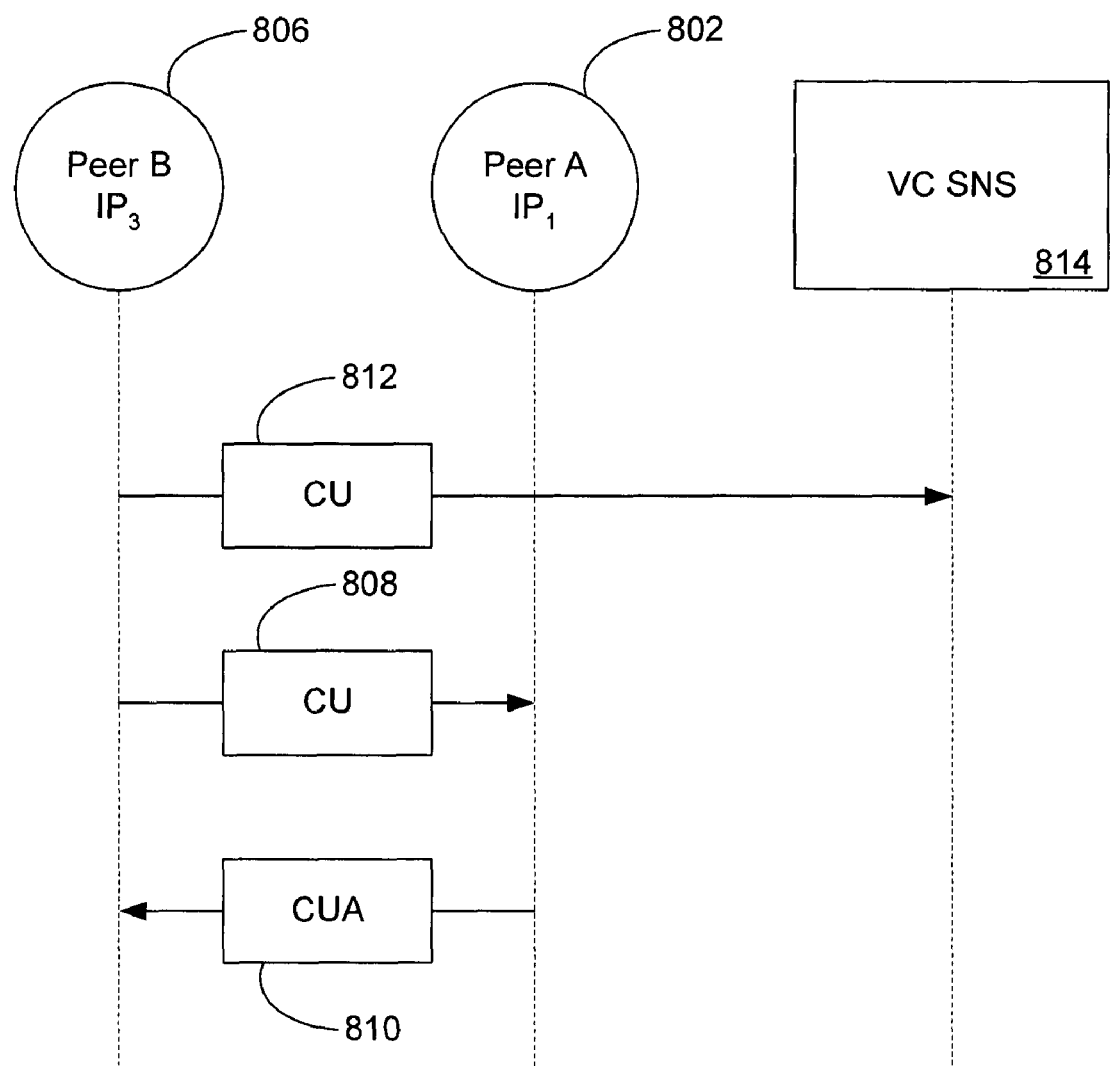
FIG. 9 is a protocol diagram depicting an example order for the virtual connectivity protocol messages of FIG. 8 in accordance with an embodiment of the invention.

FIG. 9 depicts an example order for the virtual connectivity messages of FIG. 8. Referring to FIG. 9, Peer B 806 first sends the Connection Update message 812 to the virtual connectivity subscribe-notify service 814. Simultaneously (for practical purposes), Peer B 806 sends the Connect Update message 808 to Peer A 802. In reply, Peer A 802 sends a Connect Update Acknowledge message 810 to Peer B 806. The Connection Update message 808 and the Connection Update Acknowledge message 810 are an example of a virtual connectivity message pair suitable for completing a virtual connectivity protocol for updating a communication connection between two peers. The example shown in FIG. 8 and FIG. 9 is one of the less complex virtual connectivity message protocol examples. It is described here in detail for comparison with the examples below.

Before moving on from the example depicted in FIG. 8, it will be instructive to describe a special case that may arise when the local connection translation table is updated. Following the move of Peer B from one network attachment point ($IP_2$, $port_2$) to another ($IP_3$, $port_3$), the original network attachment point may be abandoned by Peer B. A network attachment point abandoned by one peer may be claimed by or reassigned to another peer, for example, an IPv4 network service provider may manage a pool of IPv4 addresses by assigning an IPv4 address to a communications peer from the pool and then returning the IPv4 address to the pool for reassignment when the peer abandons or releases the IPv4 address. If a Peer C (not shown in FIG. 8) attaches to the network after Peer B moves, Peer C may occupy the network attachment point abandoned by Peer B. If Peer C then establishes a communication connection with Peer A while Peer A still has an active communication connection with Peer B, a conflict may occur in the local connection translation table. The table below illustrates aspects of the local connection translation table at Peer A.

|   | Original Connection Specification | Current Connection Specification |
|---|---|---|
| 1. | $IP_1$, $port_1$, $IP_2$, $port_2$, TCP | $IP_1$, $port_1$, $IP_3$, $port_3$, TCP |
| 2. | $IP_1$, $port_1$, $IP_C$, $port_C$, TCP | $IP_1$, $port_1$, $IP_C$, $port_C$, TCP |

The table shows a first local connection translation table entry with original connection specification including Peer A's network attachment point ($IP_1$, $port_1$), Peer B's original network attachment point ($IP_2$, $port_2$) and upper layer protocol TCP. The current connection specification for the first entry shows that Peer B has changed its network attachment point to ($IP_3$, $port_3$). That is, the first entry corresponds to the scenario illustrated by FIG. 8. The table also shows a second local connection translation table entry with the original connection specified as a TCP/IP connection from Peer A's network attachment point ($IP_1$, $port_1$) to Peer C's network attachment point ($IP_C$, $port_C$). The corresponding current connection specification is the same.

If $IP_C$ is the same as $IP_2$ and $port_C$ is the same as $port_2$, then the first and second entries in the local connection translation table may have the same original connection specification, that is, they may be in conflict. In this example, the conflict may be avoided at Peer A by locally reattaching the connection from Peer C to ($IP_1$, $port_A$), where $port_A$ is different from $port_1$, before accepting the connection. Like strategies may be available for non-IP-based computer networks. A similar conflict check and action may be required with regard to current connection specification to ensure a one-to-one relationship between original connection specification and current connection specification.

A malicious peer able to generate Connection Update messages may be able to cause havoc with peers utilizing virtual connectivity functionality. To prevent unauthorized connection updates, in an embodiment of the invention, each virtual connectivity message may include a cryptographic signature authenticating the message as from a trusted peer. To establish a basis for authentication, peers incorporating virtual connectivity modules may exchange a series of virtual connectivity messages when establishing a communication connection. For example, the peers may utilize an Elliptic Curve Diffie-Hellman public key exchange scheme to establish a basis for cryptographic authentication. This and other such suitable schemes are known in the art and need not be detailed here. A basis for cryptographic authentication may also be able to be utilized for message encryption if desired.

For example, the series of virtual connectivity messages sent and received when establishing a communication connection (the peer negotiation messages) may be processed by the peer negotiation component 608 of FIG. 6. Additional information exchanged by peers with peer negotiation messages may include: a peer's network attachment point as known to the peer, an indication of whether a particular peer is able to move, and an indication of the processing power of a particular peer. A peer's network attachment point may be utilized to determine if the peer is behind network address translation (NAT) as described below. The processing power of a peer may, for example, influence the cryptographic authentication scheme selected by the peers to secure the communication connection.

In an embodiment of the invention, the virtual connectivity subscribe-notify service allows communicating peers to: subscribe to peer network attachment point change events, publish network attachment point change events, and receive notification of published network attachment point change events to which they have subscribed. Subscribe-notify services (or publish-subscribe services) are known in the art, so only some of their details are described here.

In an embodiment of the invention, a network attachment point change event occurs when a peer changes its network attachment point, for example, when Peer B of FIG. 8 moves from the first network attachment point ($IP_2$, $port_2$) to the second network attachment point ($IP_3$, $port_3$). Subscribing to a network attachment point change event may include sending a subscribe message from a subscribing peer to the virtual connectivity subscribe-notify service. The subscribe message may specify a particular network attachment point which has attached a peer that, for example, the subscribing peer is actively communication with. The subscribe message may also include a notification address where the virtual connectivity subscribe-notify service may send notification of events matching the subscription. Publishing a network attachment point change event may include sending a publish message from the peer where the event occurred to the virtual connectivity subscribe-notify service specifying that a particular peer has changed its network attachment point from a first (previous or original) network attachment point to a second (or current) network attachment point. The Connection Update message is an example of a suitable publish message.

In response to the publish message, the virtual connectivity subscribe-notify service may check each of its subscriptions and send notify messages to the notification address of subscriptions that match the published event. The notify message may include the current network attachment point of the peer that moved so that, for example, the peer being notified may send the peer that moved a Connection Update Request message. The notify message may include a copy of the Connection Update message published by the peer that moved. In an embodiment of the invention, the subscription matches the published network attachment point change event if the subscription specifies the network attachment point from which the peer that published the event moved, that is, if the subscription specifies the previous network attachment point of the publishing peer. In alternative embodiments, matching the network attachment point change event to the network attachment point change event subscription may include additional steps and/or criteria described below.

Figure 10:
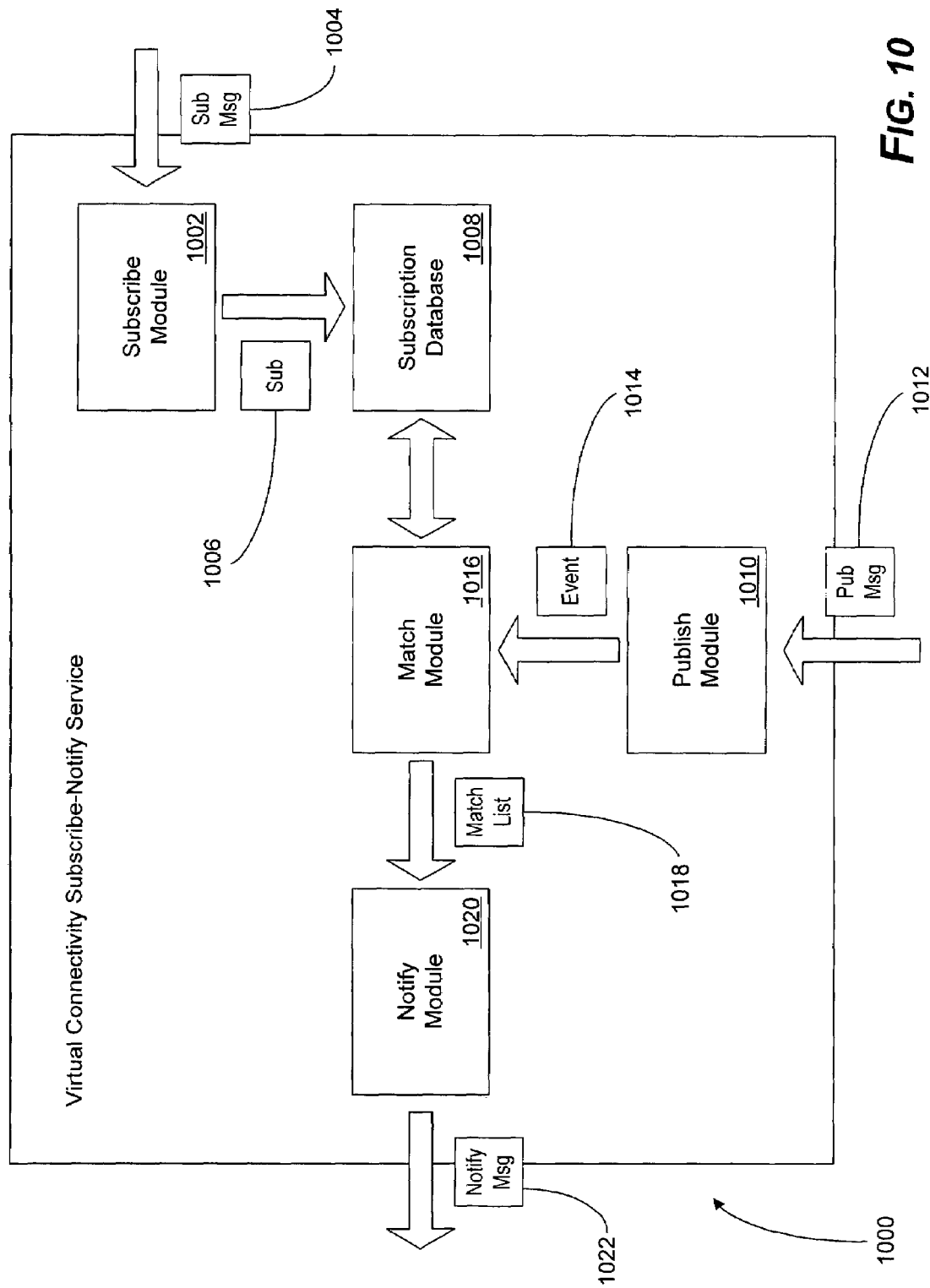
FIG. 10 is a schematic diagram illustrating an example modular virtual connectivity subscribe-notify service architecture in accordance with an embodiment of the invention.

FIG. 10 illustrates an example modular virtual connectivity subscribe-notify service architecture in accordance with an embodiment of the invention. The virtual connectivity subscribe-notify service 1000 includes a subscribe module 1002 that receives and parses subscribe messages 1004 from peers (e.g. Peer A 802 and Peer B 804 of FIG. 8), and then stores corresponding subscriptions 1006 in a subscription database 1008. A publish module 1010 receives and parses publish messages 1012 from peers and submits parsed network attachment change events 1014 to a match module 1016. The match module 1016 searches the subscription database 1008 for subscriptions matching each network attachment point change event 1014 and submits a list of matching subscriptions 1018 to a notify module 1020. The notify module 1020 generates and sends notify messages 1022 to the notification addresses of the matching subscriptions in the list 1018.

It is possible for one or more virtual connectivity subscribe-notify services to be the sole source of Connection Update messages in a computer network incorporating virtual connectivity. However, in an embodiment of the invention, scalability may be enhanced by implementing a policy that has the peer that moves send Connection Update messages directly to its communication peers whenever possible, and reserving the role of the virtual connectivity subscribe-notify service to situations where sending Connection Update messages directly ("direct connection update") is not possible. Examples of situations where direct connection update is not possible include when more than one party to a communication connection moves simultaneously, and when the peer that moves is communicating with a peer behind network address translation (NAT).

Figure 11:
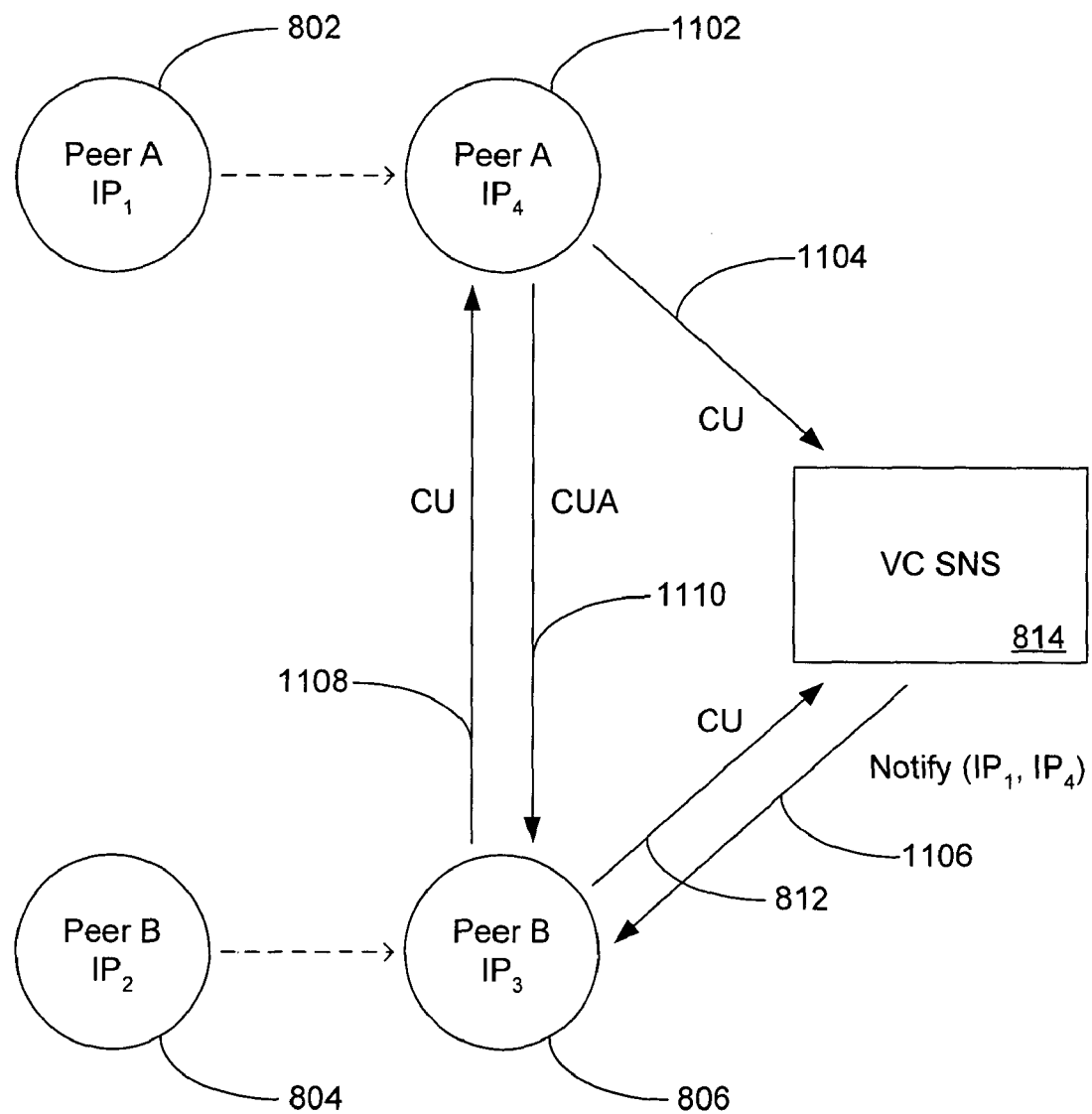
FIG. 11 is a schematic diagram illustrating an example virtual connectivity protocol for a simultaneous movement scenario in accordance with an embodiment of the invention.

FIG. 11 extends the example depicted by FIG. 8 to illustrate a role played by the virtual connectivity subscribe-notify service 814 when more than one party to a communication connection moves simultaneously. As for FIG. 8, Peer A 802 of FIG. 11 has an active communication connection with Peer B 804 over an IP network. Although not shown explicitly in FIG. 11, Peer A 802 and Peer B 804 have subscribed to changes in each other's network attachment points. That is, Peer A 802 has sent a subscribe message to the virtual connectivity subscribe-notify service 814 subscribing to network attachment point changes of the peer attached at $IP_2$ (i.e., Peer B 804) and Peer B 804 has likewise sent a subscribe message to the virtual connectivity subscribe-notify service 814 subscribing to network attachment point change events generated by the peer attached at $IP_1$ (i.e., Peer A 802).

Again as for FIG. 8, Peer B 804 changes its network attachment point, publishes the network attachment point change event by sending the Connection Update message 812 to the virtual connectivity subscribe-notify service 814, and attempts to directly update its connection with Peer A 802 by sending Peer A 802 a Connection Update message (not shown in FIG. 11). However, in FIG. 11, Peer A 802 has simultaneously (e.g., before Peer A 802 receives a Connection Update message from Peer B 806) changed its IP network attachment point from the IP address $IP_1$ to an IP address $IP_4$, that is, Peer A 802 has moved to Peer A 1102. Having moved, Peer A 1102, in accordance with an embodiment of the invention, publishes the network attachment point change event by sending a Connection Update message 1104 to the virtual connectivity subscribe-notify service 814 and then attempts to directly update its connection with Peer B 802 by sending Peer B 802 a Connection Update message (also not shown in FIG. 11).

Neither direct connection update succeeds because both peers (Peer A 802, Peer B 804) have moved. Peer A 1102 and Peer B 806 may not be able to continue to communicate without assistance. In an embodiment of the invention, the virtual connectivity subscribe-notify service 814 provides assistance by detecting the simultaneous movement of both peers (Peer A 802, Peer B 804) and notifying at least one of the peers that the other has moved. The virtual connectivity subscribe-notify service 814 may determine that, for example, two peers have moved simultaneously if each peer publishes a network attachment point change event to the virtual connectivity subscribe-notify service 814 within a configurable period of time (e.g., 1 second).

In the example illustrated by FIG. 11, the virtual connectivity subscribe-notify service 814 receives Connection Update message 1104 and Connection Update message 812 too close together in time for a direct connection update to have occurred and so determines that Peer A 802 and Peer B 804 have moved simultaneously. As a result, the virtual connectivity subscribe-notify service 814 sends a notify message 1106 to Peer B 806 notifying Peer B 806 that the network attachment point of Peer A 802 has changed. The notify message 1106 includes information enabling Peer B 806 to determine the corresponding original connection specification and current connection specification, for example, the original IP address $IP_1$ and the current IP address $IP_4$ of Peer A 1102.

As a result of receiving the notify message 1106, Peer B 806 is able to determine the current network attachment point of Peer A 1102. To update the connection between Peer B 806 and Peer A 1102, Peer B 806 sends a Connection Update (CU) message 1108 to Peer A 1102 and, in accordance with an embodiment of the invention, Peer A 1102 replies with a Connection Update Acknowledgement (CUA) message 1110. Following a successful local connection translation table update at A and B, the communication connection between Peer A 1102 and Peer B 806 has been updated.

Figure 12:
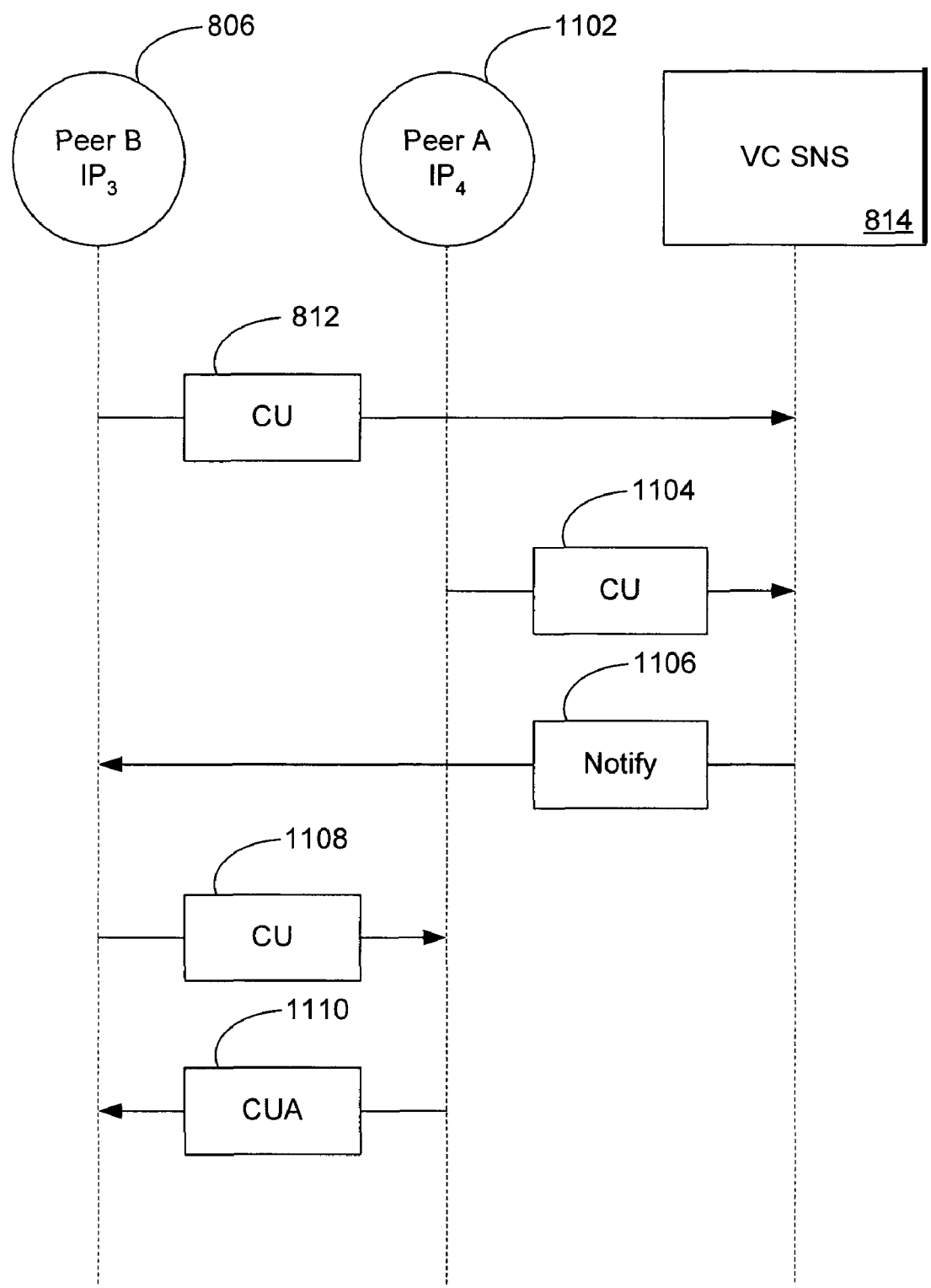
FIG. 12 is a protocol diagram depicting an example order for the virtual connectivity protocol messages of FIG. 11 in accordance with an embodiment of the invention.

FIG. 12 depicts an example order for the virtual connectivity messages of FIG. 11. Referring to FIG. 12, Peer B 806 sends the Connection Update message 812 and Peer A 1102 sends the Connection Update message 1104 to the virtual connectivity subscribe-notify service 814. The Connection Update messages 812, 1104 arrive at the virtual connectivity subscribe-notify service 814 close together in time which alerts the virtual connectivity subscribe-notify service 814 to the possibility that Peer A 1102 and Peer B 806 have moved simultaneously. To prevent the peers 1102, 806 from being unable to communicate, the virtual connectivity subscribe-notify service 814 sends the notify message 1106 to Peer B 806. Of course, the Connection Update message 1104 may arrive before the Connection Update message 812 with the same result, and, in the context of the example discussed with reference to FIG. 11, the notify message may be sent to Peer A 1102, Peer B 806 or both.

The receipt of the notify message 1106 by Peer B 806 prompts Peer B 806 to send the Connection Update message 1108 to Peer A 1102. In response to the Connection Update message 1110, Peer A 1102 sends the Connection Update Acknowledgement message 1110 to Peer B 806, completing the sequence.

In a computer network without NAT and/or when it is known that a peer is not behind NAT, the notify message 1106 may serve as the Connection Update message 1108, and the Connection Update Acknowledgement 1110 sent to Peer A 1102 in response may complete the connection update thus making the Connection Update message 1108 redundant. In a computer network with NAT, the Connection Update Request message (not shown in FIG. 12) plays a useful role as described below.

Network address translation (NAT) is known in the art, so only some of its features are described here. In some computer networks, each network attachment point is associated with a network address, for example, in an IP network, each IP network attachment point may be associated with an IP address. The network address is typically of a limited size, for example, in an IPv4 network the network address is limited to 32 bits. The set of network addresses may be understood as an address space. In networks with limited size network addresses, it is possible for network addresses to become scarce, that is, it is possible to desire more network attachment points than the network address space will support. NAT provides a way to attach a new address space to an existing address space at, for example, a single network address in the existing address space. For details of an example NAT mechanism, see Egevang et al., *The IP Network Address Translator (NAT)*, RFC 1631, Internet Engineering Task Force, May 1994.

In this description, the existing address space is called the public address space, in which, for example, the example discussed with reference to FIG. 8 occurs, and an address space that is attached to the public address space by NAT is called a private address space. A peer in the private address space (i.e., a peer that has a network attachment point associated with a private network address) is said to be behind NAT with respect to a peer in the public address space (i.e., a peer that has a network attachment point associated with a public network address).

In an embodiment of the invention, a characteristic feature of computer networks incorporating NAT is that a peer in the public address space (a public peer) may not communicate with a peer in the private address space (a private peer) unless the private peer has first contacted the public peer. Furthermore, it is common practice for the NAT mechanism to identify a peer by its network address, so that a peer that moves to a new network attachment point with a new network address may seem, to the NAT mechanism, to be a different peer. If that is the case, then a public peer that has moved will be unable to send a Connection Update message directly to a private peer. In an embodiment of the invention, the virtual connectivity subscribe-notify service is able to facilitate the connection update.

Figure 13:
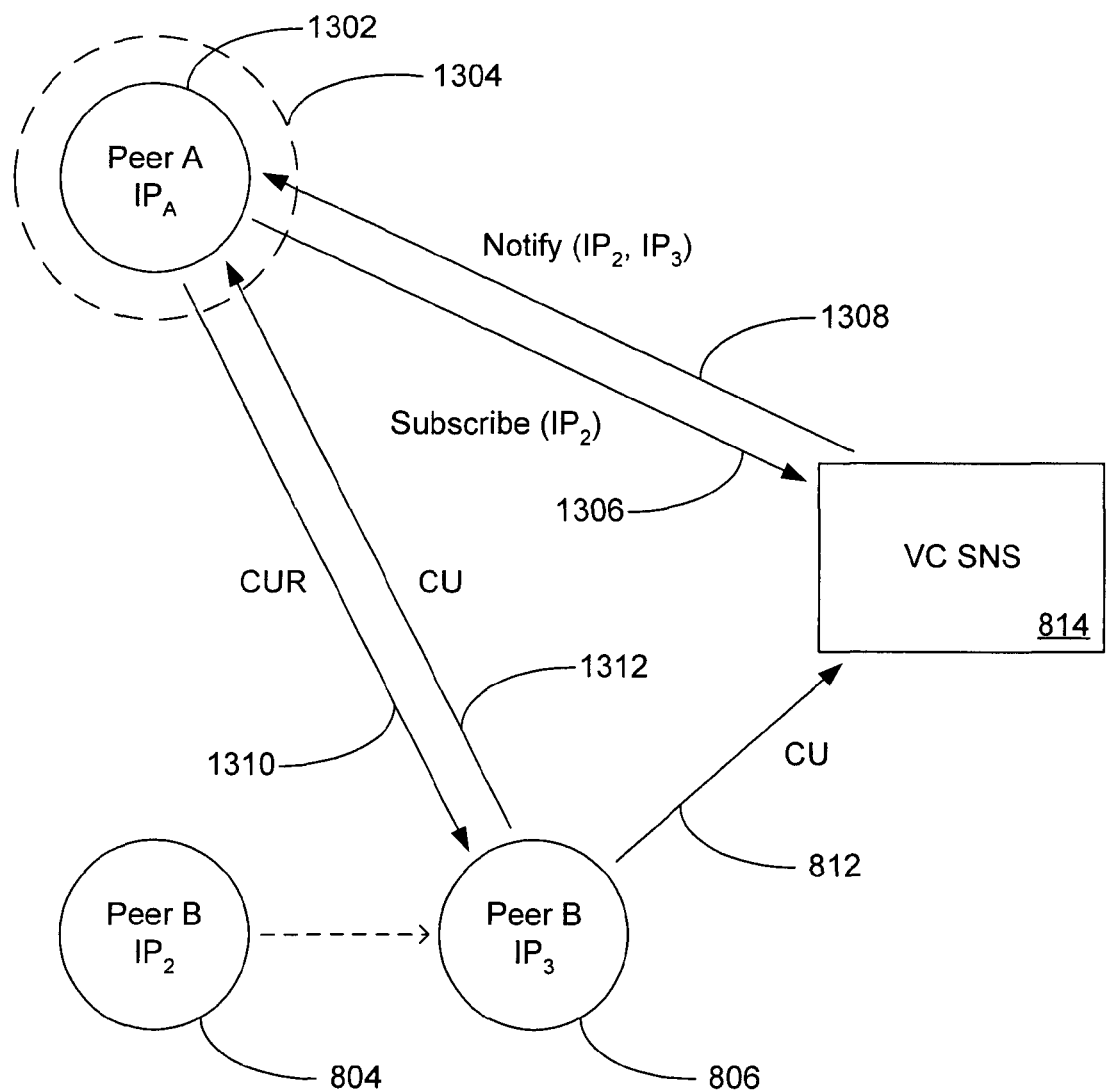
FIG. 13 is a schematic diagram illustrating an example virtual connectivity protocol in a computer network incorporating network address translation in accordance with an embodiment of the invention.

FIG. 13 depicts a variant of the example discussed with reference to FIG. 8 that illustrates a role played by the virtual connectivity subscribe-notify service 814 in a computer network that incorporates NAT. In FIG. 13, Peer A 1302 has a communication connection with Peer B 804 over an IP-based network. Peer A 1302 is behind NAT 1304, as indicated by a dashed line. Peer A 1302 has at least two IP addresses associated with it: its IP address $IP_A$ in the private address space behind NAT 1304, and its IP address $IP_{NAT}$ in the public address space. In the example illustrated by FIG. 13, Peer A 1302 does not move. Peer B 804 is initially located in the public address space at IP address $IP_2$ and then moves to IP address $IP_3$, also in the public address space.

Peer A 1302 subscribes to network attachment point change events published by Peer B 804 by sending a subscribe message 1306 to the virtual connectivity subscribe-notify service 814. By sending the subscribe message 1306, the private Peer A 1302 also establishes a communication connection with the virtual connectivity subscribe-notify service 814 over which the virtual connectivity subscribe-notify service 814 may send later messages, e.g., the notify message 1308. In an embodiment of the invention, Peer B 804 may determine that Peer A 1302 is associated with a private network address. If Peer B 804 determines that Peer A 1302 is associated with a private network address then, in an embodiment of the invention, Peer B 804 does not subscribe to changes in Peer A's 1302 network attachment point because Peer B 804 would be unable to take action, i.e., send Peer A 1302 a Connection Update message, based on a private network attachment point change event notification.

Having moved to IP address $IP_3$, Peer B 806 publishes a Connection Update message 812 to the virtual connectivity subscribe-notify service 814. If Peer B 806 attempted to send a Connection Update message (not shown in FIG. 13) directly to Peer A 1302, the attempt may fail because private Peer A 1302 has not previously contacted Peer B 806 at its new IP address $IP_3$. In an embodiment of the invention, Peer B 806 waits to be contacted by Peer A 1302 before further communicating with Peer A 1302.

As a result of receiving the Connection Update message 812, the virtual connectivity subscribe-notify service 814 searches its subscription database and determines that private Peer A 1302 has subscribed to changes in Peer B's 804 network attachment point. In contrast to the example described with reference to FIG. 11, having determined that Peer A 1302 is a private peer, the virtual connectivity subscribe-notify service 814 sends the notify message 1308 to Peer A 1302 as soon as possible. The notify message 1308 prompts Peer A 1302 to send a Connection Update Request message 1310 to Peer B 806 at Peer B's 806 new IP address $IP_3$. Peer A 1302 having first contacted Peer B 806, Peer B 806 is able to respond to the Connection Update Request message 1310 with a Connection Update message 1312. When Peer A 1302 receives the Connection Update message 1312, the virtual connectivity connection update protocol is complete.

Figure 14:
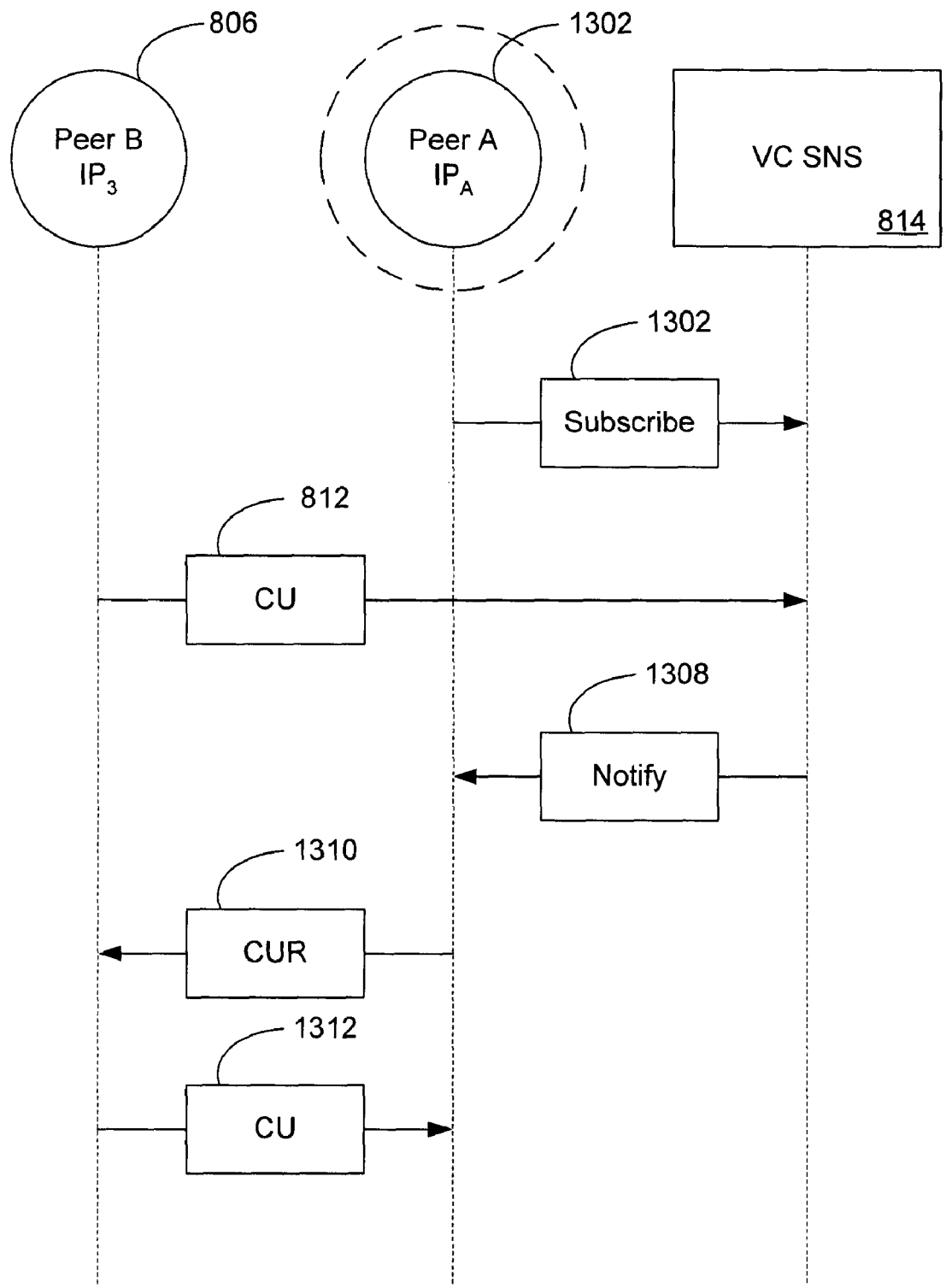
FIG. 14 is a protocol diagram depicting an example order for the virtual connectivity protocol messages of FIG. 13 in accordance with an embodiment of the invention.

FIG. 14 depicts an example order for the virtual connectivity messages described with reference to FIG. 13. Referring to FIG. 14, soon after Peer A 1302 establishes a communications connection with Peer B 804, Peer A 1302 sends the virtual connectivity subscribe-notify service 814 the subscribe message 1306 subscribing to network attachment point change events published by Peer B. Peer B 804 moves to Peer B 806 and publishes a network attachment point change event by sending the Connection Update message 812 to the virtual connectivity subscribe-notify service 814. As a result and because Peer A 1302 is private (i.e., is a private peer), the virtual connectivity subscribe-notify service 814 generates the notify message 1308 and sends it to Peer A 1302 without further delay. As a result of receiving the notify message 1308, Peer A 1302 sends the Connection Update Request message 1310 to Peer B 806 at Peer B's 806 new IP address $IP_3$. Peer B 806 sends the Connection Update message 1312 in response to the request. The Connection Update Request message 1310 and the Connection Update message 1312 are an example of a virtual connectivity message pair suitable for completing a virtual connectivity protocol for updating a communication connection between two peers.

Figure 15:
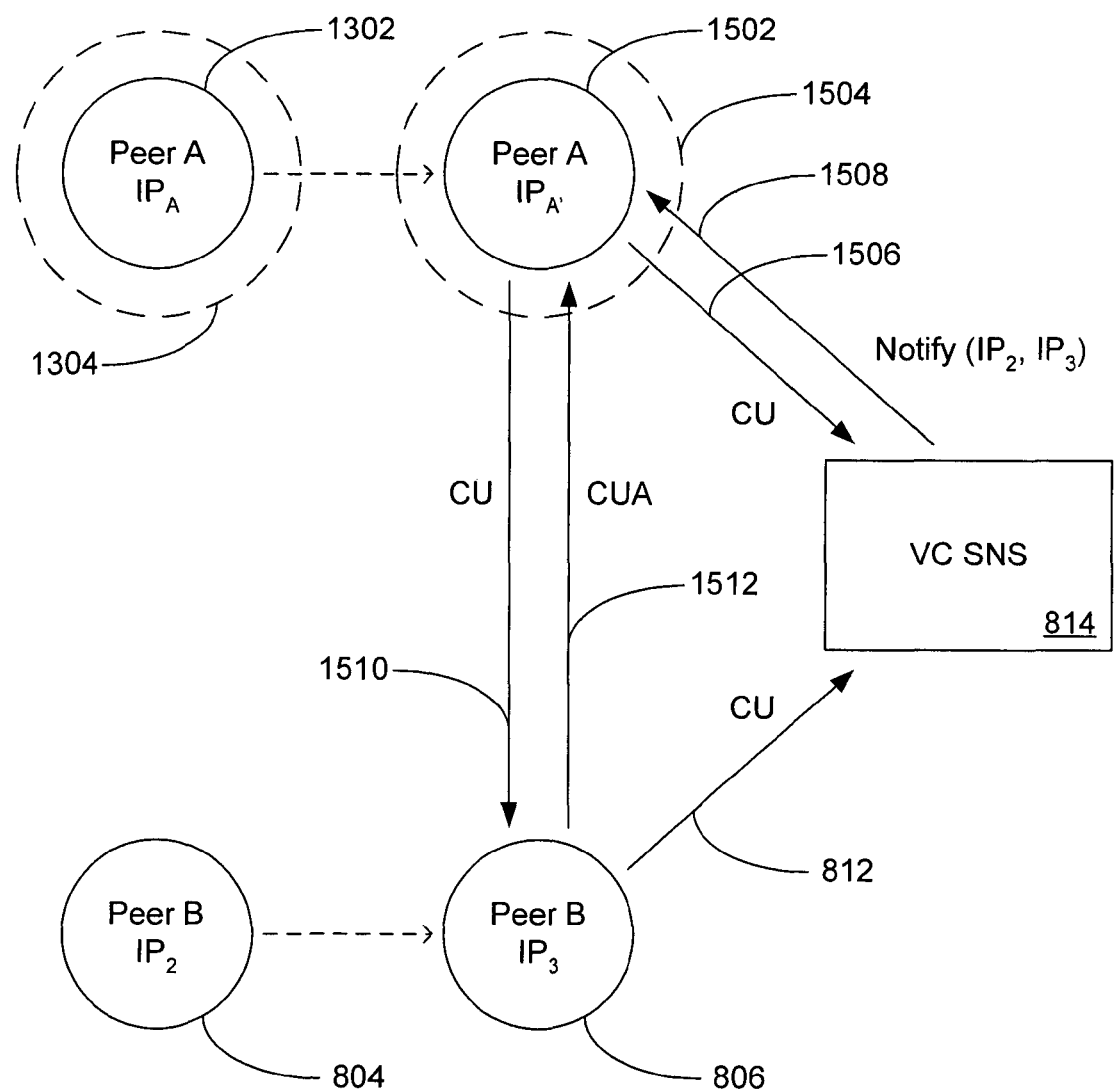
FIG. 15 is a schematic diagram illustrating an example virtual connectivity protocol for a scenario incorporating simultaneous movement and network address translation in accordance with an embodiment of the invention.

FIG. 15 extends the example depicted by FIG. 13 to illustrate a role played by the virtual connectivity subscribe-notify service 814 when more than one party to a communication connection moves simultaneously and at least one of the parties is behind NAT. As for FIG. 13, private Peer A 1302 of FIG. 15 has a communication connection with Peer B 804, and Peer A 1302 has subscribed to network attachment point change events published by Peer B 804. Peer B 804 changes its network attachment point from IP address $IP_2$ to IP address $IP_3$ and, having moved, Peer B 806 publishes the network attachment point change to the virtual connectivity subscribe-notify service 814 with the Connection Update message 812.

In FIG. 15, Peer A 1302 also changes its network attachment point from private IP address $IP_A$ to private IP address $IP_{A'}$, that is, Peer A 1302 behind NAT 1304 moves to Peer A 1502 behind NAT 1504. NAT 1304 may be the same as NAT 1504 or NAT 1504 may be different, that is, IP address $IP_{A'}$ may be in the same private address space as IP address $IP_A$ or IP address $IP_{A'}$ may be in a different private address space, for example, a private address space managed by a different organization. Having moved, private Peer A 1502 may be unable to receive messages (e.g., notify messages) from the virtual connectivity subscribe-notify service 814 (located in the public address space) as well as public Peer B. However, Peer A 1502 publishes its network attachment point change event by sending a Connection Update message 1506 to the virtual connectivity subscribe-notify service 814 and this re-establishes communications across NAT 1504 between private Peer A 1502 (at its new IP address $IP_{A'}$) and the virtual connectivity subscribe-notify service 814.

In this example, Peer B 806 has determined that Peer A 1302 is a private peer and so Peer B 806 does not attempt to send a Connection Update message directly to Peer A 1302. Having moved, Peer A 1502 does attempt to send a Connection Update message (not shown in FIG. 15) directly to Peer B 804, but Peer B 804 also having moved, the attempt fails. As for the example described with reference to FIG. 11, a notify message from the virtual connectivity subscribe-notify service 814 is able to progress the virtual connectivity protocol. Unlike the example described with reference to FIG. 11, a notify message to Peer B 806 would not enable public Peer B 806 to contact private Peer A 1502, instead the virtual connectivity subscribe-notify service 814 sends a notify message 1508 to Peer A 1502 informing Peer A 1502 of Peer B's 806 new IP address $IP_3$. Private Peer A 1502 then sends Peer B 806 a Connection Update message 1510, enabling and prompting Peer B 806 to reply with a Connection Update Acknowledge message 1512.

Figure 16:
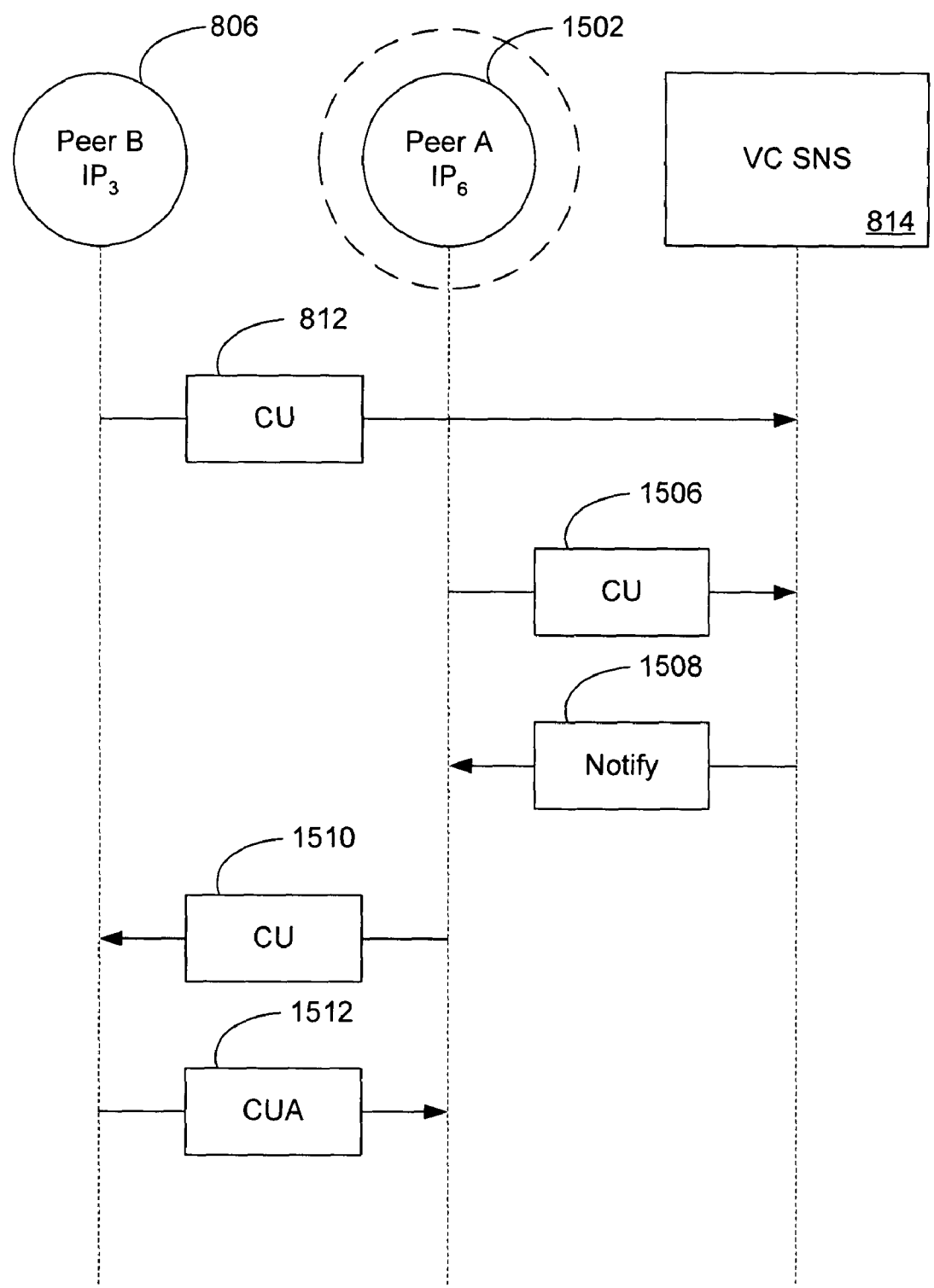
FIG. 16 is a protocol diagram depicting an example order for the virtual connectivity protocol messages of FIG. 15 in accordance with an embodiment of the invention.

FIG. 16 depicts an example order for the virtual connectivity messages of FIG. 15. Referring to FIG. 16, Peer B 806 sends the Connection Update message 812 to the virtual connectivity subscribe-notify service 814. Soon thereafter, Peer A 1502 sends the Connection Update message 1506 to the virtual connectivity subscribe-notify service 814. In response to receiving the Connection Update messages 812, 1506 close together in time, the virtual connectivity subscribe-notify service 814 sends the notify message 1508 to the Peer A 1502. In response to the notify message 1508, Peer A 1502 sends the Connection Update message 1510 to Peer B 806. The Connection Update message 1510 results in the Connection Update Acknowledge message 1512 being sent by Peer B 806 to Peer A 1502 in response.

Having described aspects of the virtual connectivity protocol with respect to various example scenarios, there now follows example decision procedures utilized by virtual connectivity protocol participants when sending virtual connectivity protocol messages in accordance with an embodiment of the invention.

Figure 17:
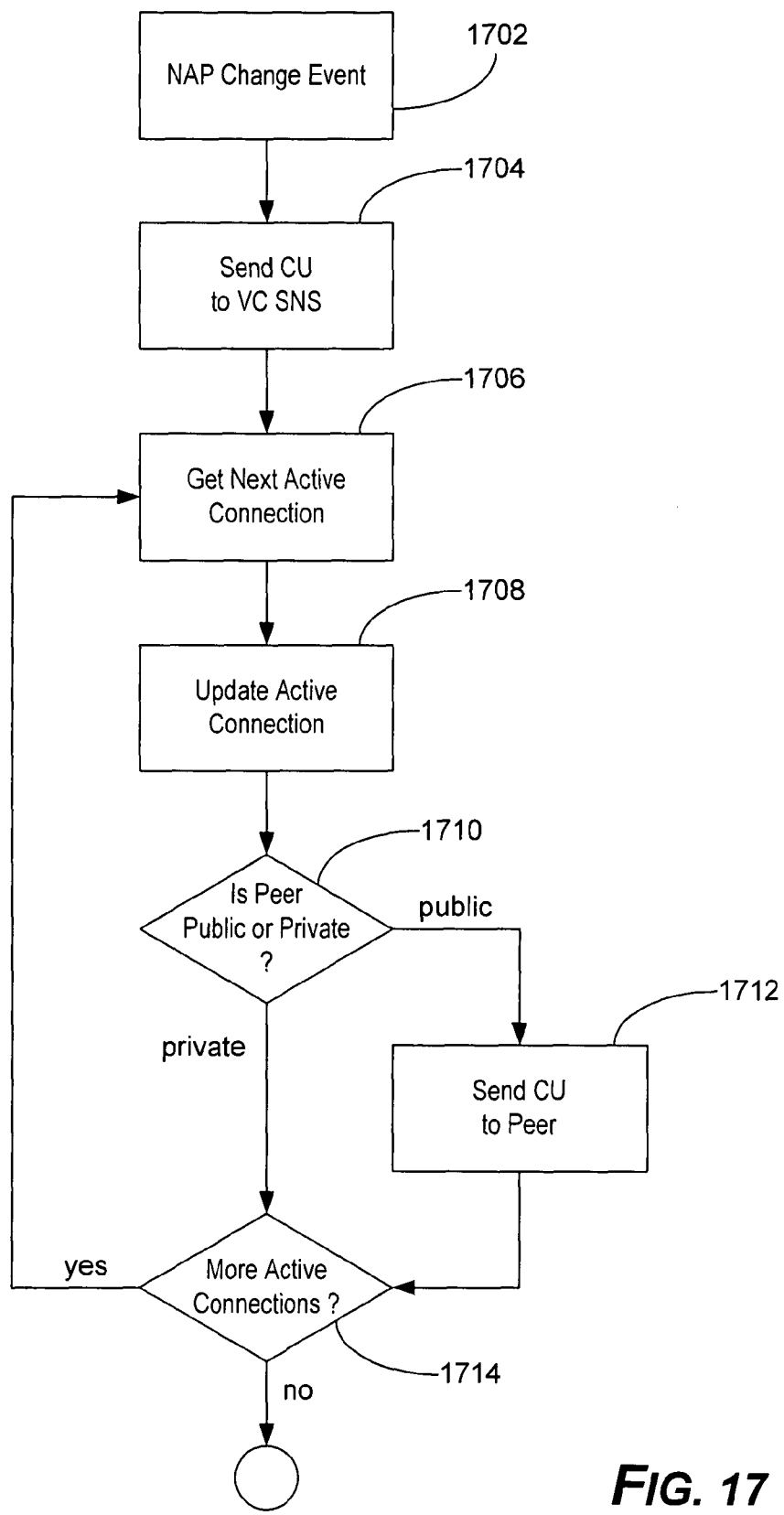
FIG. 17 is a flowchart depicting example steps performed by a virtual connectivity module in accordance with an embodiment of the invention.

FIG. 17 depicts example steps performed by, for example, the connection management component 606 (of FIG. 6) as a result of a local network attachment point (NAP) change event. At step 1702, the connection management component 606 detects that a local network attachment point change event has occurred (or is informed of the event). As a result, at step 1704 the event is published to the virtual connectivity subscribe-notify service by sending the Connection Update message to the service. At step 1706, the connection management component 606 selects the next entry in the local connection translation table 604, or the first entry if none have been previously selected. At step 1708, the selected local connection translation table 604 entry is updated so that the current connection specification is in accord with the new local network attachment point.

In order to cause an update of the corresponding LCT table 604 at a remote peer, the procedure progresses to step 1710, where it is determined if the remote peer is in the public address space or in a private address space. If the remote peer is determined to be public then the procedure progresses to step 1712. At step 1712 a Connection Update message is sent to the remote peer. If the remote peer is determined to be private, then the connection management component 606 relies on the virtual connectivity subscribe-notify service to notify the remote peer of the network attachment point change event and the procedure progresses to step 1714. At step 1714, the procedure checks if each entry in the local connection translation table 604 has been selected. If not, the procedure returns to step 1706 to select the next entry, otherwise the example procedure is finished.

Figure 18:
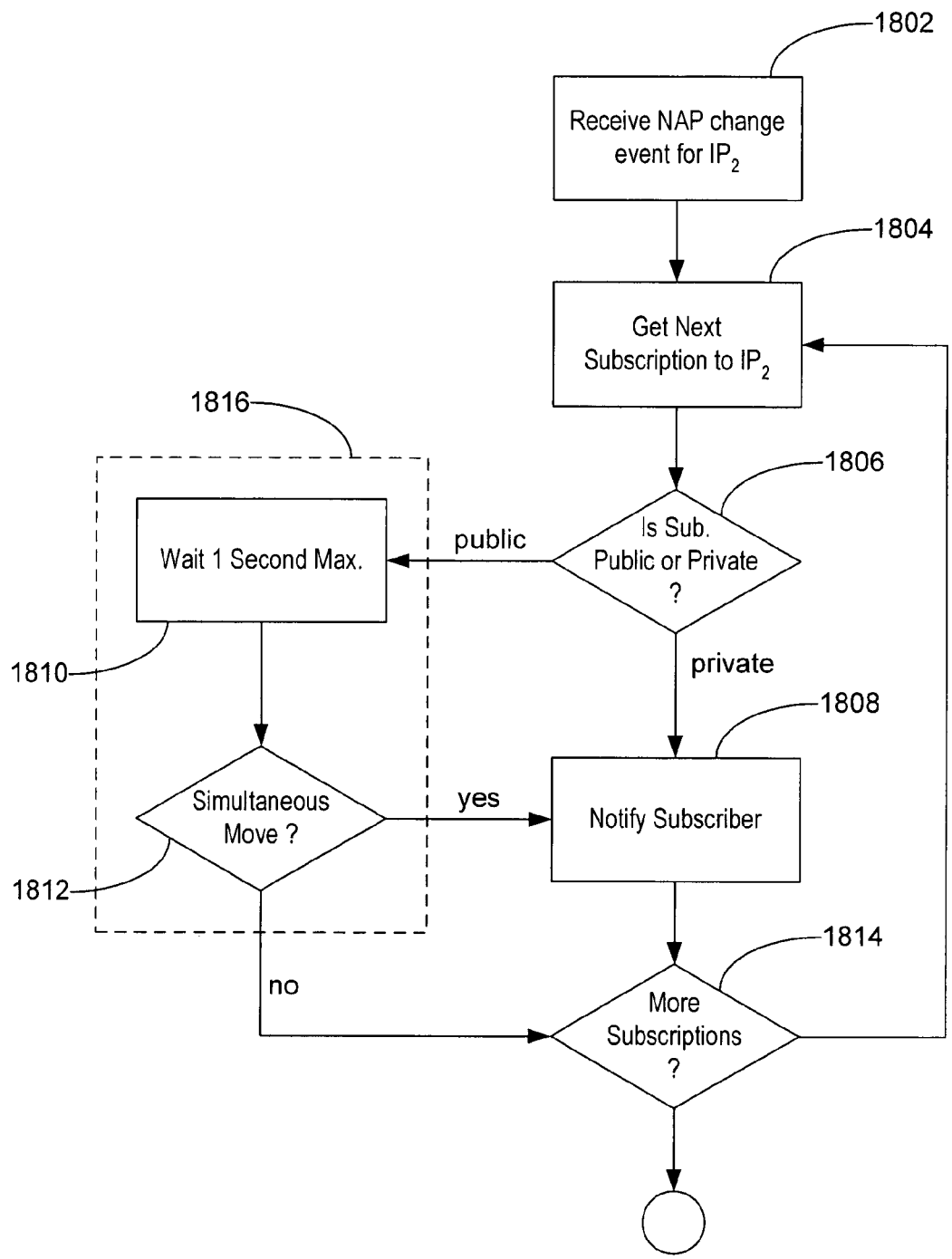
FIG. 18 is a flowchart depicting example steps performed by a virtual connectivity subscribe-notify service match module in accordance with an embodiment of the invention.

FIG. 18 depicts an example procedure performed by, for example, the match module 1016 of the virtual connectivity subscribe-notify service 1000 (of FIG. 10) as a result of a published network attachment point change event. At step 1802, the match module 1016 receives the network attachment point change event for a particular peer, in this case Peer B 804 of above examples (e.g., the example described with reference to FIG. 8) with initial IP address $IP_2$. At step 1804, the match module 1016 selects the next candidate subscription in the subscription database 1008. In this example, candidate subscriptions are subscriptions to network attachment point change events published by the peer moving from IP address $IP_2$ (i.e., Peer B 804). The first candidate subscription is selected if no candidate subscriptions have been previously selected. If there are no candidate subscriptions, the procedure may exit.

At step 1806 it is determined whether the peer that placed the subscription (the subscriber) is public or private. An example decision procedure for determining if a peer is public or private is described below with reference to FIG. 19. If the subscribing peer is private, then the peer that published the network attachment point change event is relying on the virtual connectivity subscribe-notify service to notify the private peer of the event, and the procedure progresses to step 1808. At step 1808, the subscriber is notified of the network attachment point change event. Alternatively, at step 1808 the subscriber may be added to a list of peers to be notified, for example, by the notify module 1020.

If the subscribing peer is public, then the peer that published the network attachment point change event (the publisher) may be able to send the subscriber a Connection Update message directly and without the aid of the virtual connectivity subscribe-notify service, unless, for example, the subscriber simultaneously also changes its network attachment point. In order to detect such a simultaneous movement by the subscriber, the procedure progresses to step 1810. At step 1810, the procedure waits for the subscriber to also publish a network attachment point change event, up to a maximum period of time, 1 second in this example. If the subscriber has already published a network attachment point change event when the procedure progresses to step 1810, then the procedure may spend no time waiting at step 1810.

After step 1810, the procedure progresses to step 1812 where a determination is made as to whether the subscriber may have moved before the publisher could send the subscriber a Connection Update message, that is, whether the subscriber has also published a network attachment point change event before the maximum time period expired. If the subscriber is determined to have moved "simultaneously", then the procedure progresses to step 1808 so that the subscriber may be notified of the publisher's move. Otherwise, the virtual connectivity subscribe-notify service assumes that the publisher was able to send a Connection Update message directly to the subscriber. The procedure skips step 1808 and progresses to step 1814. Although multiple threads of execution and other parallel processing techniques may be utilized to advantage throughout an embodiment of the invention, step 1810 and step 1812 are surrounded by a dashed line 1816 to indicate that these steps are good candidates for parallel processing or equivalent techniques (e.g., a periodically checked watch list) so as to minimize candidate subscriber processing loop delays.

If the candidate subscriber is private and the notification attempt fails, it may be that the private subscriber has moved as well as the publisher, as for the example described above with reference to FIG. 15. In that case, upon detection of the failure to notify, the procedure may progress to step 1810 to wait for a network attachment point change event publication by the private subscriber. The maximum step 1810 maximum waiting period for private subscribers may be different from the maximum waiting period for public subscribers.

At step 1814, the procedure checks for more candidate subscribers. If there are more candidate subscribers, then the procedure returns to step 1804 for the next subscriber. Otherwise, the procedure may exit.

In an embodiment of the invention, some behavior is determined by whether a communications peer is public or private. As described above, there may be at least two network addresses associated with a private peer: the public network address of the NAT service, and the peer's network address in the private address space created by the NAT service. A private peer may explicitly flag its private status in a virtual connectivity message to another peer. Alternatively, each peer may include its network address in one or more virtual connectivity messages that it sends. Other peers receiving the messages may then compare the included network address with the network address that is the apparent source address of the messages. If the included network address matches the apparent source address, the peer may be determined to be public. If the included network address does not match the apparent source address of the messages, then the sending peer may be determined to be private.

Figure 19:
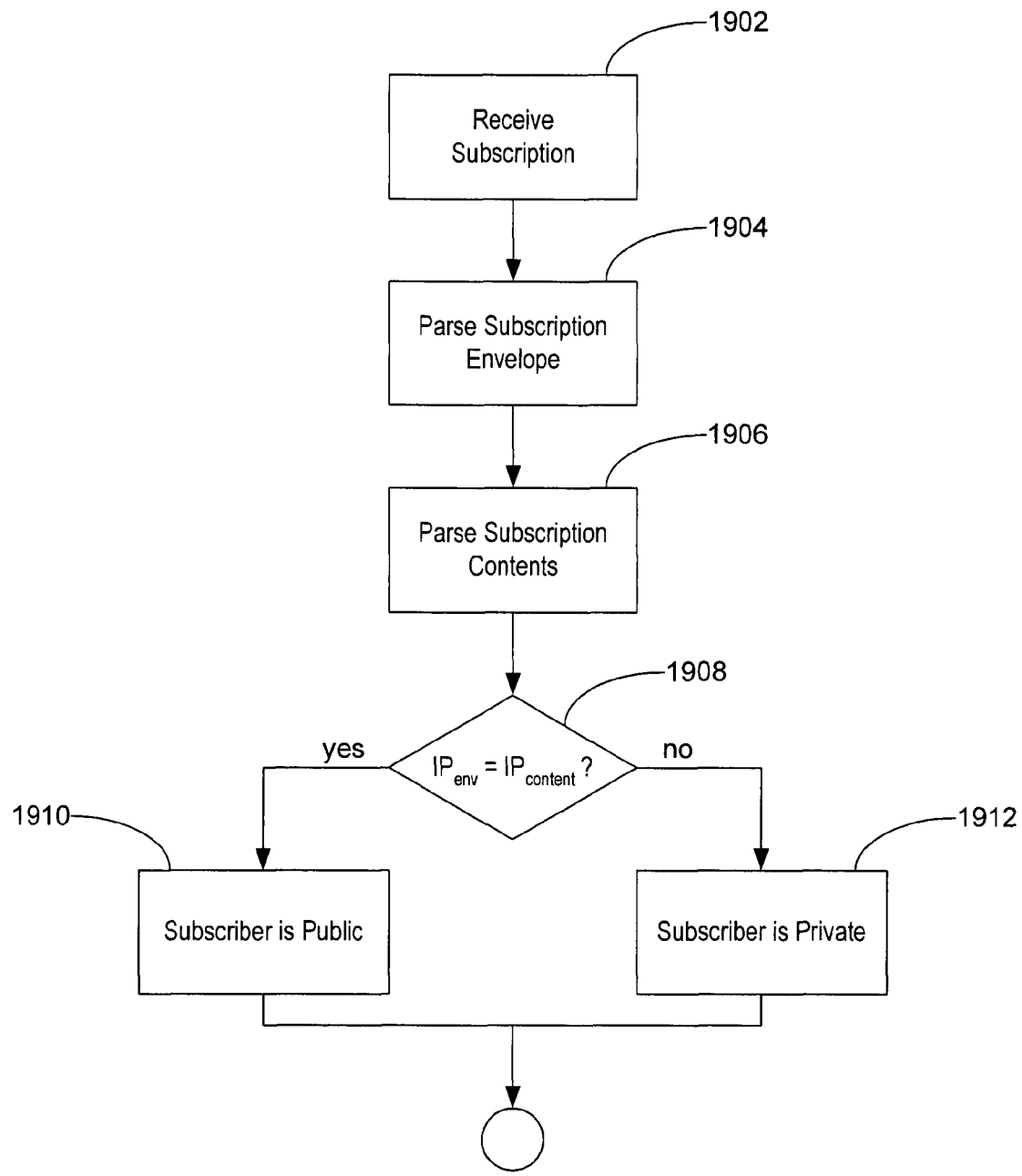
FIG. 19 is a flowchart depicting example steps performed in accordance with an embodiment of the invention by a virtual connectivity subscribe-notify service to determine if a subscriber is public or private.

FIG. 19 depicts example steps that may be performed by the virtual connectivity subscribe-notify service 1000 (of FIG. 10) to determine if a subscription is associated with a public peer or a private peer. At step 1902, the virtual connectivity subscribe-notify service receives the subscribe message from a peer over a TCP/IP network. At step 1904, the apparent source of the subscribe message is determined by parsing the message "envelope," for example, the IP-header of the message. Alternatively, the apparent source of the message may be available by querying the attributes of an established communication connection with the sending peer. At step 1906, the contents of the subscribe message is parsed. In an embodiment of the invention, the network attachment point change event subscribe message includes the network address (the IP address in this example) of the subscribing peer as that network address is known to the subscribing peer.

At step 1908, the apparent source of the subscribe message is compared with the network address included in the subscribe message. If the apparent source of the subscribe message matches the network address included in the subscribe message by the subscribing peer, then the procedure progresses to step 1910. Otherwise, the procedure progresses to step 1912. At step 1910, the subscription is determined to be associated with a public peer. At step 1912, the subscription is determined to be associated with a private peer. This determination may occur repeatedly in different modules of the virtual connectivity subscribe-notify service 1000, or just once, for example in the subscribe module 1002, and the subscription then stored in the subscription database 1008 flagged as public or private.

Virtual connectivity messages may be incorporated into lower layer networking protocols. For example, a virtual connectivity message may be added to an IP datagram by utilizing the IP options feature of the Internet protocol. For details of the IP options feature of the Internet protocol, see Postel, J., *Internet Protocol*, RFC 791, Information Sciences Institute at the University of Southern California, September 1981. When a virtual connectivity message is incorporated into a lower layer protocol datagram by utilizing one or more, for example, IP options, the additional options may be called virtual connectivity options (VC options). While virtual connectivity options carrying outgoing virtual connectivity messages are typically incorporated into outgoing protocol units generated by higher protocol layers, the virtual connectivity layer may generate its own, for example, "empty" IP packets incorporating virtual connectivity options when waiting for the next upper layer protocol unit would be ineffective and/or inefficient.

Virtual connectivity options may be added to a TCP datagram by utilizing the TCP options feature of the transmission control protocol. For details of the TCP options feature of the transmission control protocol, see Postel, J., *Transmission Control Protocol*, RFC 793, Information Sciences Institute at the University of Southern California, September 1981. Lower layer protocols that do not explicitly support datagram options may still be able to incorporate virtual connectivity options by appending the virtual connectivity options to the lower layer protocol datagram. FIG. 20 depicts an example scheme for appending virtual connectivity options to a UDP datagram.

In FIG. 20, one or more virtual connectivity options 2002 have been appended to a UDP datagram that will be sent over an IP network. The UDP datagram includes a UDP header 2004 and a UDP body 2006. The UDP header 2004 includes an UDP data length field (Length$_{UDP}$) indicating the length of the UDP datagram including the user data in the UDP body 2006. For further details of the user datagram protocol see Postel, J., *User Datagram Protocol*, RFC 768, Information Sciences Institute at the University of Southern California, August 1980. The UDP datagram is prefaced by an IP header 2008 so that it may be sent over an IP network. The UDP datagram and virtual connectivity options 2002 are the body of the IP datagram in this example. The IP header 2008 includes an IP header length data field ($Length_{IP\ Header}$) indicating the number of bytes in the IP header 2008, and an IP total data length field ($Length_{IP}$) indicating the number of bytes in the IP datagram (header 2008 and body 2004, 2006, 2002.). The length of the virtual connectivity options 2002 ($Length_{VC\ Options}$) may be calculated as follows.

$$Length_{VC\ Options} = Length_{IP} - Length_{IP\ Header} - Length_{UDP}$$

That is, the number of bytes (octets) of the one or more virtual connectivity options 2002 is calculated as the total number of bytes in the IP datagram less the number of bytes in the IP header 2008 and less the number of bytes in the UDP datagram.

Similar schemes may be utilized to append virtual connectivity options to other lower layer protocol datagrams. However, such appended data may not be properly interpreted by peers that do not incorporate a virtual connectivity module (e.g., the virtual connectivity module 600 of FIG. 6). To test if a remote peer incorporates the virtual connectivity module, one or more virtual connectivity options, for example, a particular virtual connectivity probe option, may be incorporated into the first network protocol datagram sent to the remote peer. If the reply includes one or more corresponding virtual connectivity options, then the remote peer may be flagged as VC enhanced, that is, as able to properly participate in the virtual connectivity protocol.

Figure 21:
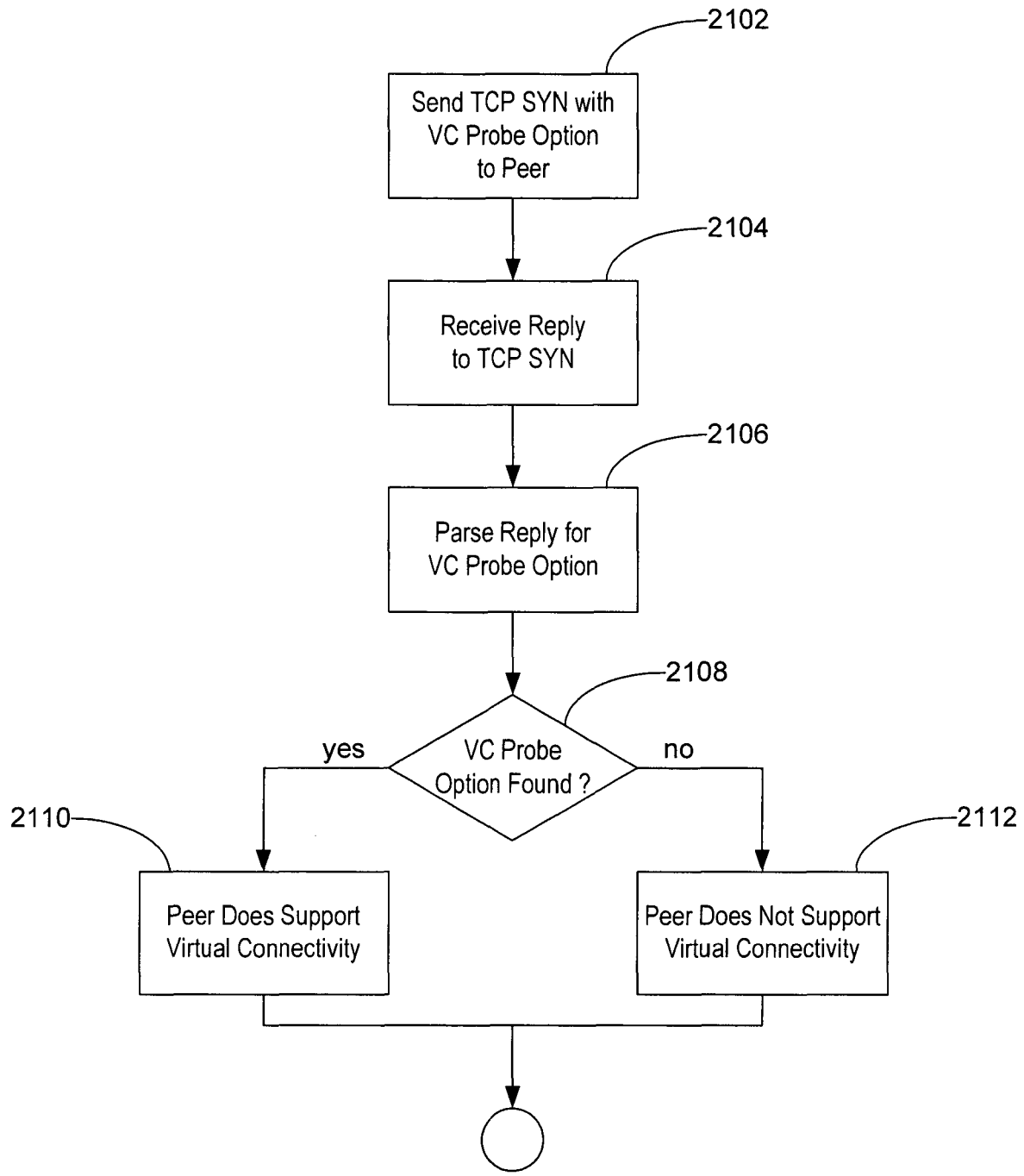
FIG. 21 is a flowchart depicting example steps performed in accordance with an embodiment of the invention by a virtual connectivity module to determine if a remote peer supports virtual connectivity functionality.

FIG. 21 illustrates example steps performed by, for example, the peer negotiation component 608 (of FIG. 6) of the virtual connectivity module 600 to determine if a remote peer supports virtual connectivity operations. At step 2102, the initial TCP datagram, with the SYN flag set, and incorporating a virtual connectivity probe option, is sent to the remote peer. At step 2104, a reply to the initial TCP datagram is received, for example, a TCP datagram with the SYN and ACK flags set or with the RST flag set. At step 2106, the reply is parsed for the virtual connectivity probe option. At step 2108, a determination is made as to whether the reply incorporates the virtual connectivity probe option. If the reply does incorporate the virtual connectivity probe option, then the procedure progresses to step 2110 where the remote peer is flagged as VC enhanced. Otherwise, the procedure progresses to step 2112, the remote peer is flagged as not VC enhanced, and no further virtual connectivity messages are sent to the remote peer. Virtual connectivity functionality as described above is not available in this case.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-readable medium storing computer-executable instructions for providing a subscribe-notify service with virtual connectivity to perform a method on a computing device comprising:

receiving at least one network attachment point change event subscription from at least one network attachment point change event subscriber, network attachment point change events comprising an indication of a change in a network address of a device on a network from an original network attachment point having an original network attachment point identification to a current network attachment point having a current network attachment point identification;

receiving at least one network attachment point change event publication from at least one network attachment point change event publisher, the network attachment point change event publication comprising an identification of an original network attachment point and an identification of a current network attachment point that is different from the original network attachment point, wherein the identification of the original network attachment point and the identification of the current attachment point is synchronized with an entry in a local connection translation table stored locally on a remote peer; and for each network attachment point change event publication matching a network attachment point change event subscription, notifying the network attachment point change event subscriber of the matching published network attachment point change event, wherein an application layer continuously refers to a current attachment point on the network by using an original network attachment point identification regardless of the number of network attachment point changes, and a lower protocol layer refers to the current network attachment point, and, wherein the application layer is unaware of network attachment point changes.

2. The computer-readable medium of claim 1, wherein each identification of a network attachment point comprises an Internet protocol (IP) address.

3. The computer-readable medium of claim 1, wherein each network attachment point change event subscription comprises identification of a network attachment point that has attached a communications peer with which the network attachment point change event subscriber has at least one active communication connection.

4. The computer-readable medium of claim 1, wherein the at least one network attachment point change event publication comprises:
   a first network attachment point change event publication from a first network attachment point change event publisher; and
   a second network attachment point change event publication from a second network attachment point change event publisher; and
   matching the first network attachment point change event to each network attachment point change event subscription comprises:
      determining that the network attachment point change event subscription was placed by the second network attachment point change event publisher; and
      determining that the second network attachment point change event occurred within a time interval of the first network attachment point change event.

5. The computer-readable medium of claim 1, wherein matching the network attachment point change event to the network attachment point change event subscription comprises determining that the network attachment point change event subscription was placed by a subscriber with a private network address.

6. The computer-readable medium of claim 1, wherein the method further comprises, for each network attachment point change event subscriber, determining if the network attachment point change event subscriber has a private network address.

7. The computer-readable medium of claim 6, wherein:
   each network attachment point change event subscription comprises a network attachment point change event subscriber notification address; and
   determining if the network attachment point change event subscriber has a private network address comprises determining if the network attachment point change event subscriber notification address is in accord with the public source of the network attachment point change event subscription.

8. A computer-readable medium storing computer-executable instructions for providing a virtual connectivity subscribe-notify service with virtual connectivity to perform a method on a computing device comprising:
   sending a subscribe message to the virtual connectivity subscribe-notify service subscribing to at least one network attachment point change event published by a remote peer, the at least one network attachment point change event comprising a change in a network address of the remote peer;
   receiving a notify message from the virtual connectivity subscribe-notify service notifying of a network attachment point change event published by a remote peer; and
   synchronizing a previous network address entry associated to a previous network attachment point of the remote peer in a locally stored local connection translation table with a corresponding current network address entry associated to a current network attachment point of the remote peer,
   wherein an application layer continuously refers to the current network attachment point by referring to the previous network attachment point regardless of the number of network attachment point changes, and a lower protocol layer refers to the current network attachment point, and,
   wherein the application layer is unaware of attachment point changes.

9. The computer-readable medium of claim 8, the method further comprising sending a publish message to the virtual connectivity subscribe-notify service publishing a network attachment point change event.

10. The computer-readable medium of claim 9, wherein the publish message comprises:
    an identifier of a previous network attachment point; and
    an identifier of a current network attachment point.

11. The computer-readable medium of claim 8, wherein the notify message comprises:
    an identifier of a previous network attachment point of the remote peer; and
    an identifier of a current network attachment point of the remote peer.

12. The computer-readable medium of claim 8, the method further comprising:
    sending a publish message to the virtual connectivity subscribe-notify service publishing a local network attachment point change event.

13. The computer-readable medium of claim 8, wherein:
    the virtual connectivity subscribe-notify service is located in a public address space; and
    the subscribe message is sent from a private address space.

14. The computer-readable medium of claim 8, the method further comprising:
    as a result of receiving the notify message, sending a Connection Update Request message to the remote peer requesting a Connection Update message from the remote peer.

15. A computing device for providing a virtual connectivity subscribe-notify service with virtual connectivity comprising:
    a processor; and
    memory coupled to the processor, the memory comprising computer-program instructions executable by the processor for:
    sending a subscribe message to the virtual connectivity subscribe-notify service subscribing to at least one network attachment point change event published by a remote peer, the at least one network attachment point change event comprising a change in a network address of the remote peer;
    receiving a notify message from the virtual connectivity subscribe-notify service notifying of a network attachment point change event published by a remote peer; and
    synchronizing a previous network address entry associated to a previous network attachment point of the remote peer in a locally stored local connection translation table with a corresponding current network address entry associated to a current network attachment point of the remote peer,
    wherein an application layer refers to the current network attachment point by continually referring to the previous network attachment point regardless of the number of network attachment point changes, and a lower protocol layer refers to the current network attachment point, and, wherein the application layer is unaware of attachment point changes.

16. The computing device of claim 15, further comprising sending a publish message to the virtual connectivity subscribe-notify service publishing a network attachment point change event.

17. The computing device of claim 15, wherein the publish message comprises:
an identifier of a previous network attachment point; and
an identifier of a current network attachment point.

18. The computing device of claim 15, wherein the notify message comprises:
an identifier of a previous network attachment point of the remote peer; and
an identifier of a current network attachment point of the remote peer.

19. The computing device of claim 15, further comprising:
sending a publish message to the virtual connectivity subscribe-notify service publishing a local network attachment point change event.

20. The computing device of claim 15, wherein:
the virtual connectivity subscribe-notify service is located in a public address space; and
the subscribe message is sent from a private address space.

21. The computing device of claim 15, further comprising:
as a result of receiving the notify message, sending a Connection Update Request message to the remote peer requesting a Connection Update message from the remote peer.

* * * * *